(12) United States Patent
Inoue et al.

(10) Patent No.: US 11,115,694 B2
(45) Date of Patent: Sep. 7, 2021

(54) INFORMATION PROCESSING APPARATUS, METHOD, AND PROGRAM

(71) Applicant: Sony Corporation, Tokyo (JP)

(72) Inventors: Akira Inoue, Tokyo (JP); Shusuke Takahashi, Chiba (JP); Masayuki Nishiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/656,487

(22) Filed: Oct. 17, 2019

(65) Prior Publication Data

US 2020/0053402 A1    Feb. 13, 2020

Related U.S. Application Data

(63) Continuation of application No. 15/059,600, filed as application No. PCT/JP2014/005186 on Oct. 10, 2014, now Pat. No. 10,484,728.

(30) Foreign Application Priority Data

Oct. 21, 2013  (JP) .................................. 2013-218267
Dec. 12, 2013  (JP) .................................. 2013-257508

(Continued)

(51) Int. Cl.
*H04N 21/242*    (2011.01)
*G11B 27/10*    (2006.01)
(Continued)

(52) U.S. Cl.
CPC .......... *H04N 21/242* (2013.01); *G11B 27/10* (2013.01); *H04N 5/04* (2013.01); *H04N 5/60* (2013.01);
(Continued)

(58) Field of Classification Search
CPC ............ H04N 21/242; H04N 21/4122; H04N 21/4394; H04N 21/23602; H04N 21/4342; H04N 21/8547; G11B 27/10; G11B 27/28
See application file for complete search history.

(56) References Cited

U.S. PATENT DOCUMENTS 7,903,751 B2    3/2011   Fiesel et al.
7,907,212 B2    3/2011   Girardeau, Jr. et al.
(Continued)

FOREIGN PATENT DOCUMENTS

CN    101189661 A    5/2008
CN    102177726 A    9/2011
(Continued)

OTHER PUBLICATIONS

International Search Report and Written Opinion dated Jan. 19, 2015 in connection with International Application No. PCT/JP2014/005186.

(Continued)

*Primary Examiner* — Yassin Alata
(74) *Attorney, Agent, or Firm* — Wolf, Greenfield & Sacks, P.C.

(57) ABSTRACT

An information processing apparatus for reproducing second content in synchronization with reproduction of first content by a second information processing apparatus different from the information processing apparatus, the first content comprising audio content. The information processing apparatus comprising circuitry configured to: extract a first feature from the audio content; obtain a second feature of the audio content, the second feature being together with the second content; compare the first feature with the second feature; and generate, based on results of the comparing, (Continued)

synchronization information used for reproducing the second content in synchronization with the first content.

3 Claims, 29 Drawing Sheets

(30) Foreign Application Priority Data

| | | | |
|---|---|---|---|
| Jan. 7, 2014 | (JP) | ................................ | 2014-000831 |
| Jun. 4, 2014 | (JP) | ................................ | 2014-115406 |

(51) Int. Cl.

| | |
|---|---|
| *H04N 5/04* | (2006.01) |
| *H04N 5/60* | (2006.01) |
| *H04N 21/41* | (2011.01) |
| *H04N 21/439* | (2011.01) |
| *H04N 21/236* | (2011.01) |
| *H04N 21/434* | (2011.01) |
| *H04N 21/8547* | (2011.01) |
| *G11B 27/28* | (2006.01) |

(52) U.S. Cl.
CPC ... *H04N 21/23602* (2013.01); *H04N 21/4122* (2013.01); *H04N 21/4342* (2013.01); *H04N 21/4394* (2013.01); *H04N 21/8547* (2013.01); *G11B 27/28* (2013.01)

(56) References Cited

U.S. PATENT DOCUMENTS

| | | | |
|---|---|---|---|
| 8,400,566 B2 | 3/2013 | Terry et al. | |
| 10,484,728 B2 | 11/2019 | Inoue et al. | |
| 2004/0052314 A1* | 3/2004 | Copeland ............... | H04B 1/707 375/296 |
| 2006/0140392 A1* | 6/2006 | Ahmadi .................. | H04B 3/23 379/406.1 |
| 2007/0220561 A1 | 9/2007 | Girardeau et al. | |
| 2008/0013614 A1 | 1/2008 | Fiesel et al. | |
| 2008/0267416 A1* | 10/2008 | Goldstein ............ | H04R 1/1091 381/56 |
| 2011/0063503 A1 | 3/2011 | Brand et al. | |
| 2011/0261257 A1 | 10/2011 | Terry et al. | |
| 2011/0307931 A1 | 12/2011 | Shuster | |
| 2013/0135526 A1 | 5/2013 | Minemura | |
| 2016/0269762 A1 | 9/2016 | Inoue et al. | |

FOREIGN PATENT DOCUMENTS

| | | | |
|---|---|---|---|
| EP | 2 631 910 A1 | 8/2013 | |
| JP | 2006005390 A | 1/2006 | |
| JP | 2007-306363 A | 11/2007 | |
| JP | 2008-131341 A | 6/2008 | |
| JP | 2012-500584 A | 1/2012 | |
| JP | 2012-244413 A | 12/2012 | |
| JP | 2013-085139 A | 5/2013 | |
| JP | 2013-518495 A | 5/2013 | |
| JP | 2013-115782 A | 6/2013 | |
| JP | 2013-174765 A | 9/2013 | |
| KR | 10-2011-0125674 A | 11/2011 | |
| WO | WO 2010/021966 A1 | 2/2010 | |

OTHER PUBLICATIONS

International Preliminary Report on Patentability dated May 6, 2016 in connection with International Application No. PCT/JP2014/005186.

Japanese Office Action dated Feb. 22, 2018 in connection with Japanese Application No. 2014-115406.

Chinese Office Action dated Apr. 20, 2018 in connection with Chinese Application No. 201480056387.0, and English translation thereof.

European Communication Pursuant to Article 94(3) EPC dated Feb. 5, 2019 in connection with European Application No. 14 793 631.4.

[No Author Listed], Information technology—Coding of audio-visual objects—Part 3: Audio, Amendment 5: Support for Dynamic Range Control, New Levels for ALS Simple Profile, and Audio Synchronization. ISO/IEC 14496-3:2009/DAM 5. Dated Jul. 11, 2014. 32 Pages.

[No Author Listed], Information technology—High efficiency coding and media delivery in heterogeneous environments—Part 3: 3D audio. ISO/IEC CD 23008-3. Dated Apr. 4, 2014. 32 Pages.

U.S. Appl. No. 15/029,600, filed Apr. 14, 2016, Inoue et al.

Korean Office Action dated Jun. 16, 2020 in connection with Korean Application No. 10-2016-7009295, and English translation thereof.

* cited by examiner

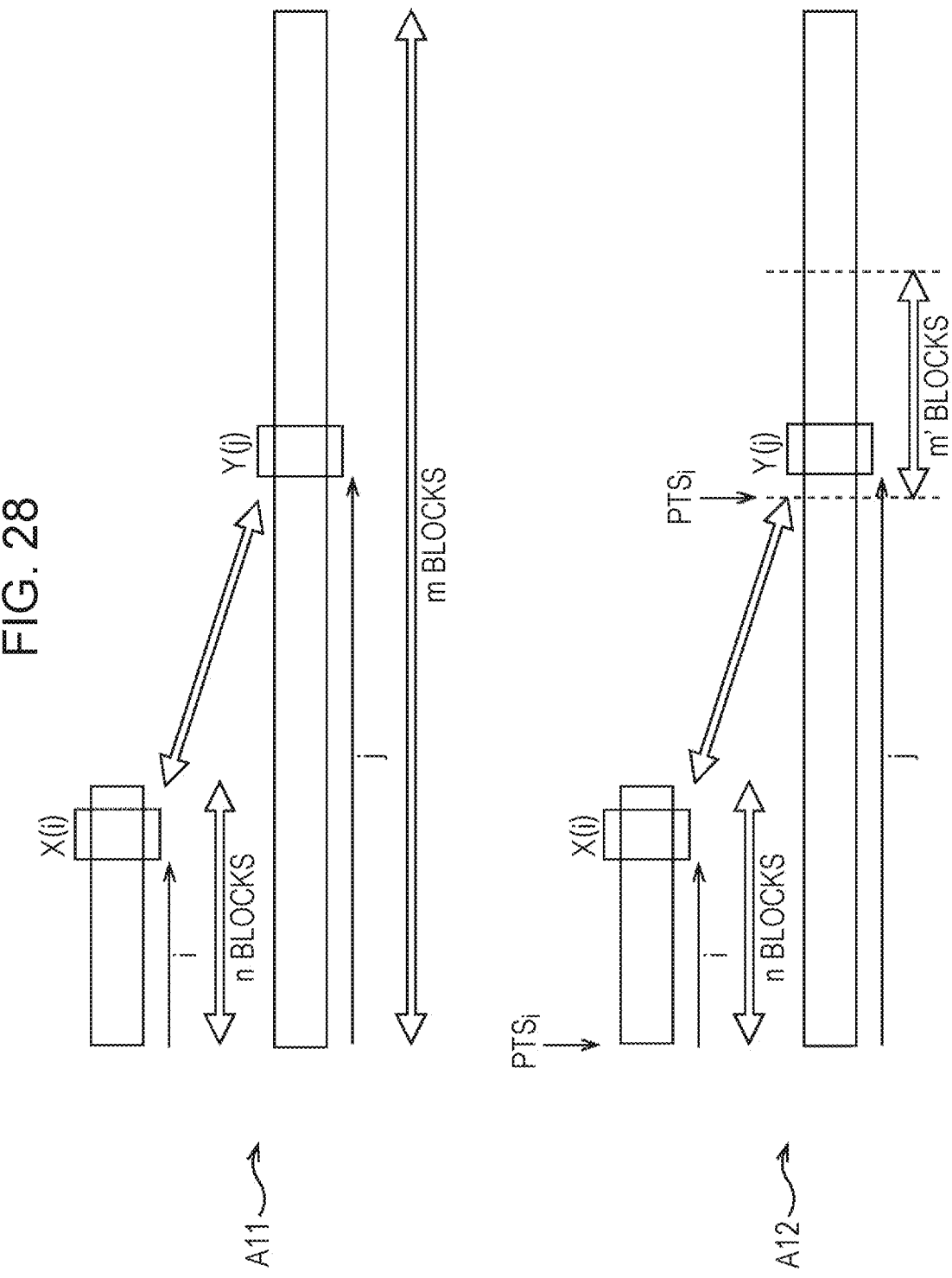

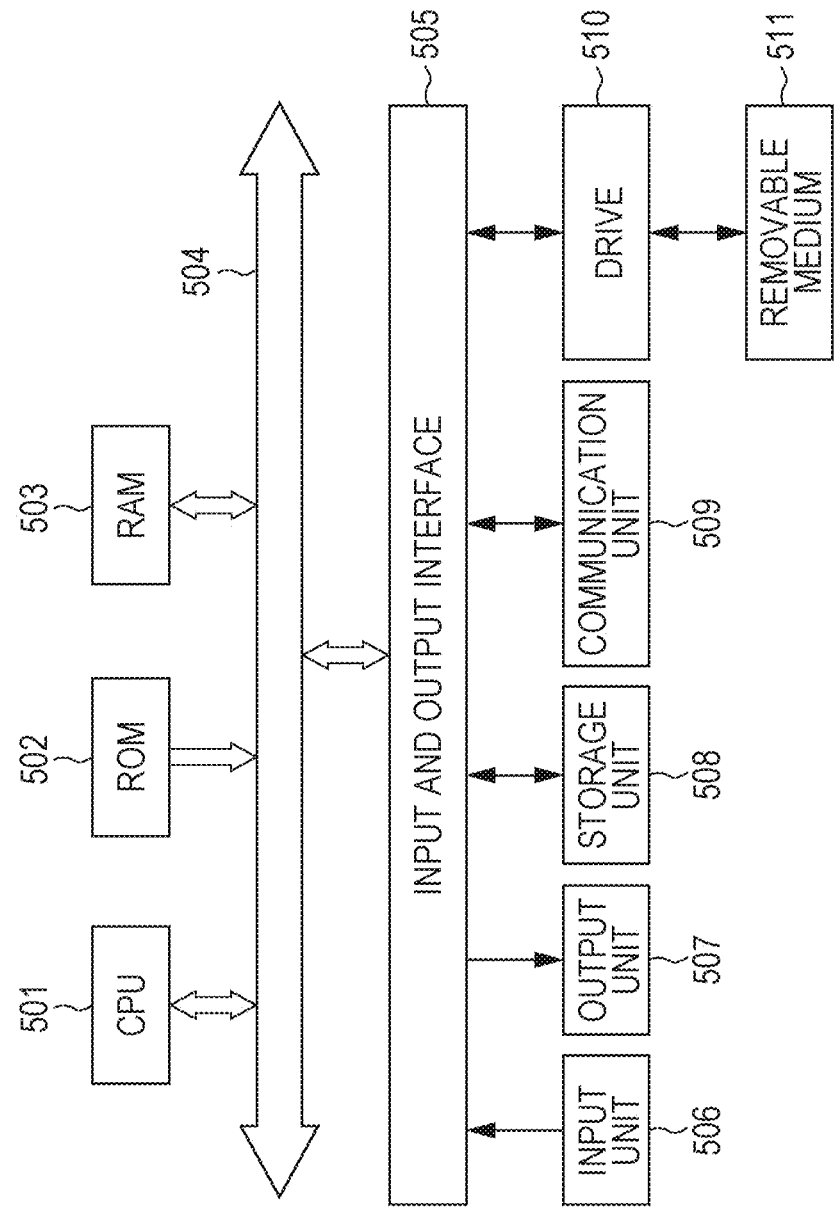

INFORMATION PROCESSING APPARATUS, METHOD, AND PROGRAM

CROSS REFERENCE TO RELATED APPLICATIONS

The present application claims the benefit under 35 U.S.C. § 120 as a continuation application of U.S. application Ser. No. 15/029,600, filed on Apr. 14, 2016, now U.S. Pat. No. 10,484,728, which is a national stage application under 35 U.S.C. § 371 of International Application Serial No. PCT/JP2014/005186, filed on Oct. 10, 2014, which claims the benefit of Japanese Priority Patent Application JP 2013-218267 filed Oct. 21, 2013, Japanese Priority Patent Application JP 2013-257508 filed Dec. 12, 2013, Japanese Priority Patent Application JP 2014-000831 filed Jan. 7, 2014, and Japanese Priority Patent Application JP 2014-115406 filed Jun. 4, 2014, the entire contents of each of which are incorporated herein by reference.

TECHNICAL FIELD

The present technology relates to an information processing apparatus, a method, and a program, and particularly to an information processing apparatus, a method, and a program capable of synchronizing a plurality of pieces of content acquired through different routes.

CROSS REFERENCE TO RELATED APPLICATIONS

This application claims the benefit of Japanese Priority Patent Application JP 2013-218267 filed Oct. 21, 2013, Japanese Priority Patent Application JP 2013-257508 filed Dec. 12, 2013, Japanese Priority Patent Application JP 2014-000831 filed Jan. 7, 2014, and Japanese Priority Patent Application JP 2014-115406 filed Jun. 4, 2014, the entire contents of each of which are incorporated herein by reference.

BACKGROUND ART

In recent years, devices which can reproduce various kinds of media content on the assumption of network connection, such as multifunctional mobile phones and tablet terminal devices, have increased. Furthermore, utilization based on a combination of a plurality of devices using a network function, which includes a television receiver or the like that has been present in the related art, became necessary.

As a combination of a plurality of devices, an application program for receiving a plurality of pieces of media content such as (A1) to (A4) shown below, which have a time-synchronized relationship, by the plurality of devices through broadcasting, the internet, or the like and reproducing the pieces of content in a synchronized manner can be assumed.

(A1) Foreign language sound content, commentary sound content, closed captioning, and character information for main video and sound content (A2) A plurality of pieces of video and sound content acquired by playing a musical composition by each instrument and capturing an image of a scene where each instrument is being played (A3) Video and sound content obtained by imaging one scene in a plurality of angles (A4) Main video and sound content and high-definition version of video and sound content thereof It is necessary to reproduce such a plurality of pieces of content in a state where synchronization is maintained during the reproduction. For example, a technology of synchronizing a plurality of pieces of content by extracting feature amounts from respective pieces of content imaged at the same time by a plurality of different imaging apparatuses and calculating a similarity of the feature amounts has been disclosed as a technology of synchronizing a plurality of pieces of content (see PTL 1, for example).

CITATION LIST

Patent Literature

[PTL 1]
Japanese Unexamined Patent Application Publication No. 2013-174765

SUMMARY OF INVENTION

Technical Problem

Incidentally, when it is attempted to receive media content as described above by a plurality of devices via respectively different paths, it is difficult to reproduce the content while maintaining synchronization due to a transmission delay, a delay in transmission and reception processing, a difference in operation clocks of the receiving devices, or the like in practice. According to the technology disclosed in PTL 1, it is difficult to synchronize pieces of content in a case where the pieces of content to be synchronized and reproduced do not have any similar features.

It is desirable to enable synchronization of a plurality of pieces of content acquired through different routes.

Solution to Problem

According to a first embodiment of the present technology, there is provided an information processing apparatus including: a feature amount calculation unit which extracts a feature amount from a sound signal of first content; and a synchronization calculation unit which generates synchronization correction information based on a sound feature amount for reproducing second content in synchronization with the first content, by comparing the feature amount acquired in synchronization with the second content that has a time-synchronized relationship with the first content with the feature amount that is extracted by the feature amount calculation unit.

The feature amount calculation unit may extract the feature amount from the sound signal which is obtained by collecting sound in the first content being reproduced.

The information processing apparatus may further include: a first input unit which acquires the second content and the feature amount that is associated with the second content in synchronization with the second content.

The second content and the feature amount may be transmitted to the information processing apparatus at a timing which is determined in consideration of a difference in arrival time from that of the first content.

The first input unit may request transmission of the second content and the feature amount and receive the second content and the feature amount which are transmitted in response to the request.

The information processing apparatus may further include: a second input unit which requests transmission of the first content and receives the first content which is transmitted in accordance with the request.

The feature amount calculation unit may extract the feature amount of a piece of the first content being reproduced from the sound signal, and the synchronization calculation unit may specify the first content being reproduced by comparing the respective feature amounts of a plurality of pieces of first content, which are associated with the second content, with the feature amount extracted by the feature amount calculation unit and generate synchronization correction information based on the sound feature amount for reproducing the specified first content and the second content in synchronization with each other.

The information processing apparatus may further include: a reproduction processing unit which controls reproduction of the second content.

The reproduction processing unit may correct a reproduction position in the second content depending on the synchronization correction information based on the sound feature amount.

The information processing apparatus may further include: an acquiring unit which acquires presentation time information of the first content; and a comparison unit which compares the presentation time information of the first content and the presentation time information of the second content and generates the synchronization correction information based on the presentation time information, and the synchronization calculation unit may generate the synchronization correction information based on the sound feature amount by comparing a feature amount within a range, which is indicated by the synchronization correction information based on the presentation time information, from among a series of acquired feature amounts with the feature amount extracted by the feature amount calculation unit.

The synchronization calculation unit may compare the feature amounts after performing frame rate conversion on at least one of the acquired feature amounts and the feature amount extracted by the feature amount calculation unit such that a frame rate of the acquired feature amount coincides with a frame rate of the feature amount extracted by the feature amount calculation unit.

According to a first embodiment of the present technology, there is provided an information processing method and a program including: extracting a feature amount from a sound signal of first content; and generating synchronization correction information based on a sound feature amount for reproducing second content in synchronization with the first content, by comparing the feature amount acquired in synchronization with the second content that has a time-synchronized relationship with the first content with the feature amount that is extracted in the extracting.

In the first embodiment of the present technology, the feature amount is extracted from the sound signal of the first content, and the synchronization correction information based on the sound feature amount for reproducing second content in synchronization with the first content is generated by comparing the feature amount acquired in synchronization with the second content that has the time-synchronized relationship with the first content with the feature amount that is extracted in the extracting.

According to a second embodiment of the present technology, there is provided an information processing apparatus including: a feature amount calculation unit which extracts a feature amount from a sound signal of first content; and a first output unit which outputs second content that has a time-synchronized relationship with the first content and the feature amount that is associated with second content in synchronization with the second content.

The information processing apparatus may further include: a second output unit which outputs the first content.

The first output unit may output the second content and the feature amount at a timing which is determined in consideration of a difference in arrival time from that of the first content.

When transmission of the second content and the feature amount is requested, the first output unit may output the second content and the feature amount in response to the request.

When transmission of the first content is requested, the second output unit may output the first content in response to the request.

The feature amount calculation unit may extract feature amounts of a plurality of pieces of first content from the sound signals, and the first output unit may associate and output the feature amounts of the plurality of pieces of first content with the second content.

The feature amount calculation unit may downsample the feature amount, and the first output unit may output the second content and the downsampled feature amount.

According to a second embodiment of the present technology, there is provided an information processing method and a program including: extracting a feature amount from a sound signal of first content; and outputting second content that has a time-synchronized relationship with the first content and the feature amount that is associated with second content in synchronization with the second content.

In the second embodiment of the present technology, the feature amount is extracted from the sound signal of the first content, and the second content that has the time-synchronized relationship with the first content and the feature amount that is associated with the second content in synchronization with the second content are output.

Advantageous Effects of Invention

According to the first and second embodiments of the present technology, it is possible to synchronize a plurality of pieces of content acquired through different routes.

In addition, the present technology is not necessarily limited to the effect described above, and any effects described in this technology may be achieved.

BRIEF DESCRIPTION OF DRAWINGS

FIG. 28 is a diagram illustrating a block as a target of similarity calculation.

FIG. 29 is a diagram showing a configuration example of a computer.

DESCRIPTION OF EMBODIMENTS

Figure 1:
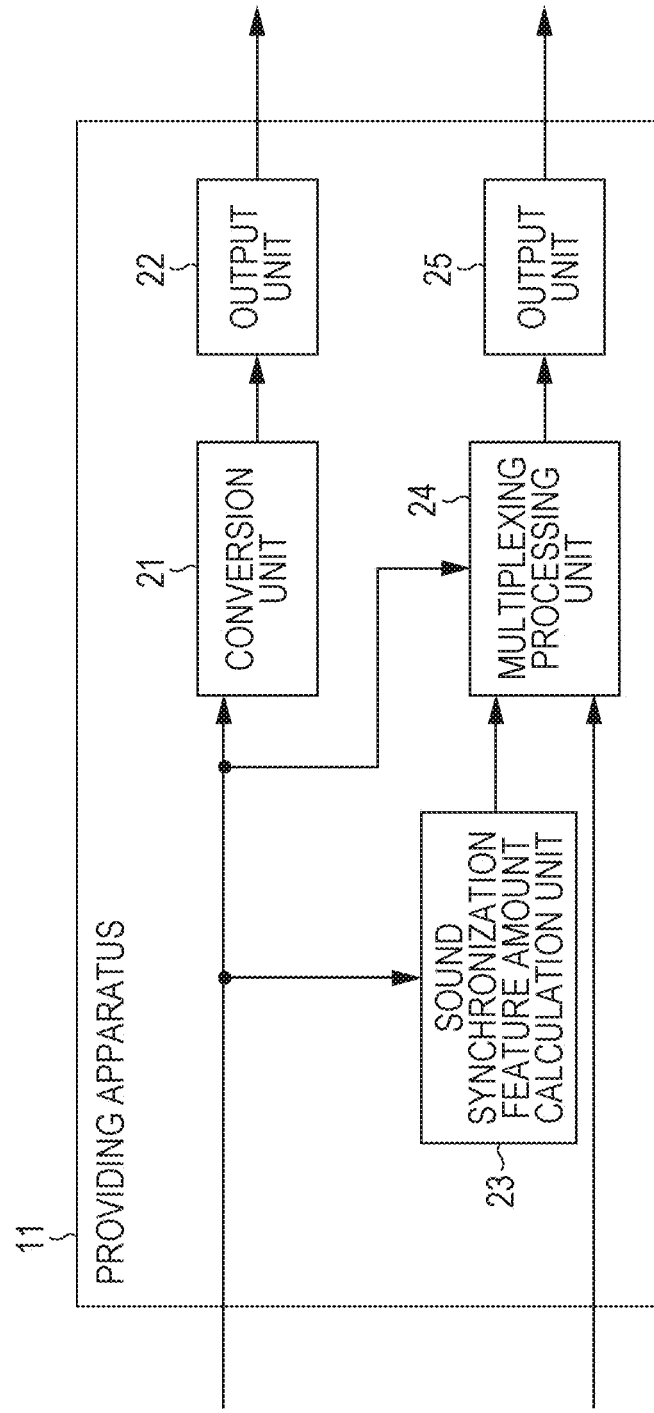
FIG. 1 is a diagram showing a configuration example of a providing apparatus.

Hereinafter, a description will be given of an embodiment, to which the present technology is applied, with reference to the drawings.

First Embodiment

<Features of Present Technology>

First, a description will be given of features of the present technology.

The present technology includes the following features B1 to B6, in particular.

(Feature B1)

According to the present technology, it is possible to implement a method and an apparatus with the following configuration for performing automatic synchronization by using sound when a plurality of pieces of media content containing different content are transmitted via different transmission paths and are received by a plurality of different devices.

(1) The media content is a data stream acquired by multiplexing videos, sound, images, character information, and the like.

(2) The plurality of pieces of media content as transmission targets have time-synchronized relationships as in the aforementioned examples (A1) to (A4).

(3) At least one of the plurality of pieces of media content as transmission targets is determined to be a main channel signal, a sound synchronization feature amount is calculated from the sound signal, and a main transmission signal is generated from a main channel signal in a transmission format defined by the system.

(4) In order for time-synchronized relationship between each piece of remaining media content (sub channel signal) and the main channel signal is met, multiplexing processing of the sound synchronization feature amount of the main channel signal and the sub channel signal is performed in a transmission format defined by the system, and a sub transmission signal is generated.

(5) A main receiving device which receives the main transmission signal outputs the sound signal of the main channel signal through a speaker or the like in reproducing the main channel signal.

(6) A sub receiving device which receives the sub transmission signal including the sound synchronization feature amount of the main channel signal collects sound of the main channel signal, which is output by the main receiving device through the speaker, through a microphone or the like, calculates a sound synchronization feature amount, performs automatic synchronous calculation with the sound synchronization feature amount of the received main channel signal, and calculates synchronization correction information (time difference information) based on the sound feature amount.

(7) The sub receiving device performs the synchronization correction processing with the main channel signal on the received sub channel signal and performs reproduction with reference to the synchronization correction information based on the sound feature amount.

In addition, as the aforementioned (1) transmission of a data stream, transmission of media content in a network such as broadcasting or the Internet is assumed, and a logical transmission path occupied by a multiplexed data stream will be referred to as a transmission path.

In addition, "the calculation of the sound synchronization feature amount" and "the automatic synchronous calculation" described above are implemented by technologies disclosed in Japanese Unexamined Patent Application Publication No. 2013-174765, for example. It is also possible to downsample the sound synchronization feature amount before the transmission or to perform the frame rate conversion of the sound synchronization feature amount, as necessary, during the automatic synchronous calculation utilizing the sound synchronization feature amount.

By using such a technology, it is possible to perform the automatic synchronous calculation in a robust manner even in an adverse environment with noise or unwanted sound when the sub receiving device collects the sound of the main channel signal. In addition, it is not necessary to use the technology.

In this case, it is necessary to transmit the sub transmission signal prior to the transmission of the main transmission signal.

(Feature B2)

In the aforementioned (Feature B1), a system on the transmission side transmits the main transmission signal and the sub transmission signal to the main receiving device and the sub receiving device, respectively, in a unilateral manner.

In this case, it is necessary to transmit the sub transmission signal prior to the main transmission signal.

(Feature B3)

In the aforementioned (Feature B1), the system on the transmission side transmits the main transmission signal to the main receiving device in the unilateral manner, and the sub receiving device acquires the sub transmission signal via a network at a timing of the sub receiving device itself, performs the automatic synchronous calculation, and performs synchronous reproduction of the sub channel signal.

An advantage of this configuration is that the sub receiving device can control the acquisition of the sub transmission signal depending on convenience of the sub receiving device itself in consideration of delay in transmission through the network or the like.

(Feature B4)

In the aforementioned (Feature B1), the main receiving device acquires the main transmission signal via the network at a timing of the main receiving device itself and reproduces the main channel signal, and the sub receiving device also acquires the sub transmission signal via the network at a timing of the sub receiving device itself, performs the automatic synchronous calculation, and performs synchronous reproduction of the sub channel signal.

An advantage of this configuration is that the sub receiving device can control the acquisition of the sub transmission signal depending on convenience of the sub transmission signal itself in consideration of delay in transmission via through the network or the like.

(Feature B5)

In the aforementioned (Feature B1), a plurality of series of sound signals of main channel signals are present.

For example, a plurality of series of main channel signals correspond to main sound and supplementary sound for two-language broadcasting. Sound synchronization feature amounts are calculated for all the series of sound signals, and are multiplexed and transmitted with the sub channel signal. The sub receiving device determines which of the sound of the main channel signals are being reproduced when synchronous calculation is performed between the collected sound and all the received sound synchronization feature amounts. Switching of the sound signals output by the main receiving device is also detected in the synchronous calculation.

(Feature B6)

In the aforementioned (Feature B1), "deviation in synchronization" is detected in the automatic synchronous calculation by the sub receiving device, and real-time correction processing is performed on the side of the sub receiving device.

Since the main receiving device and the sub receiving device independently operate, audio clocks differ, and deviation in synchronization occurs. Thus, it is possible to reproduce a plurality of pieces of content while maintaining synchronization, by detecting and correcting the deviation in synchronization.

<Configuration Example of Providing Apparatus>

Next, a description will be given of a specific embodiment to which the present technology is applied.

First, a description will be given of a configuration example of a providing apparatus which provides content with a time-synchronized relationship as in the aforementioned examples shown in (A1) to (A4).

FIG. 1 is a diagram showing a configuration example of a providing apparatus. To a providing apparatus 11, a main channel signal which is a signal for reproducing principal content (hereinafter, referred to as main content) and a sub channel signal which is a signal for reproducing content with relevant content in the main content (hereinafter, referred to as sub content) are supplied.

Here, the main content and the sub content are configured of at least any of a video and sound and have a time-synchronized relationship with each other. That is, it is desirable that the main content and the sub content be reproduced in a synchronized state during reproduction.

In addition, the following description will be continued on the assumption that the main content and the sub content are respectively configured of image signals for reproducing videos and sound signals accompanied with the image signals. Therefore, the main channel signal and the sub channel signal in this example are respectively configured of the image signals and the sound signals.

The providing apparatus 11 includes a conversion unit 21, an output unit 22, a sound synchronization feature amount calculation unit 23, a multiplexing processing unit 24, and an output unit 25.

The conversion unit 21 converts the supplied main channel signal into a signal in a format defined by a predetermined broadcasting rule or the like and supplies the main transmission signal acquired as a result to the output unit 22. The output unit 22 broadcasts via a broadcasting wave or transmit via a communication network such as the Internet the main transmission signal supplied from the conversion unit 21.

The sound synchronization feature amount calculation unit 23 extracts a sound synchronization feature amount from a sound signal which configures the supplied main channel signal, and supplies the sound synchronization feature amount to the multiplexing processing unit 24. Here the sound synchronization feature amount is a feature amount which is to be used for synchronizing and reproducing the sub content with the main content when the main content and the sub content are reproduced.

The multiplexing processing unit 24 adjusts the time-synchronized relationship between the sound synchronization feature amount from the sound synchronization feature amount calculation unit 23 and the supplied sub channel signal by using the supplied main channel signal. That is, since the main channel signal and the sub channel signal are in the synchronized state in advance in the providing apparatus 11, the multiplexing processing unit 24 associates the sound synchronization feature amount with the sub channel signal in a state where the sound synchronization feature amount and the sub channel signal are synchronized in the time-synchronized relationship, by using the main channel signal. In a MPEG-4 system, for example, each of an audio signal, a video signal, and the like is handled as a single media object (Elementary Stream (ES)) and is multiplexed. Since a time attribute is defined in minimum units called access units (AU) which are acquired by dividing the ES, it is possible to easily multiplex the sound synchronization feature amount with the media object as the sub channel signal by handling the sound synchronization feature amount as one media object including time attribute information.

In addition, the multiplexing processing unit 24 multiplexes the sound synchronization feature amount and the sub channel signal in a temporally synchronized state, then performs the format conversion as necessary, and supplies a sub transmission signal acquired as a result to the output unit 25.

The output unit 25 transmits the sub transmission signal supplied from the multiplexing processing unit 24 through a broadcasting wave or through a communication network including the Internet, for example. Here, the main transmission signal and the sub transmission signal are transmitted to the system on the content reproduction side via mutually different transmission paths.

Although the providing apparatus 11 in the example shown in FIG. 1 is configured of a single apparatus, the providing apparatus 11 may be configured of a plurality of apparatuses, or the respective processing may be executed by cloud computing.

<Configuration Example of Sound Synchronization Feature Amount Calculation Unit>

Figure 2:
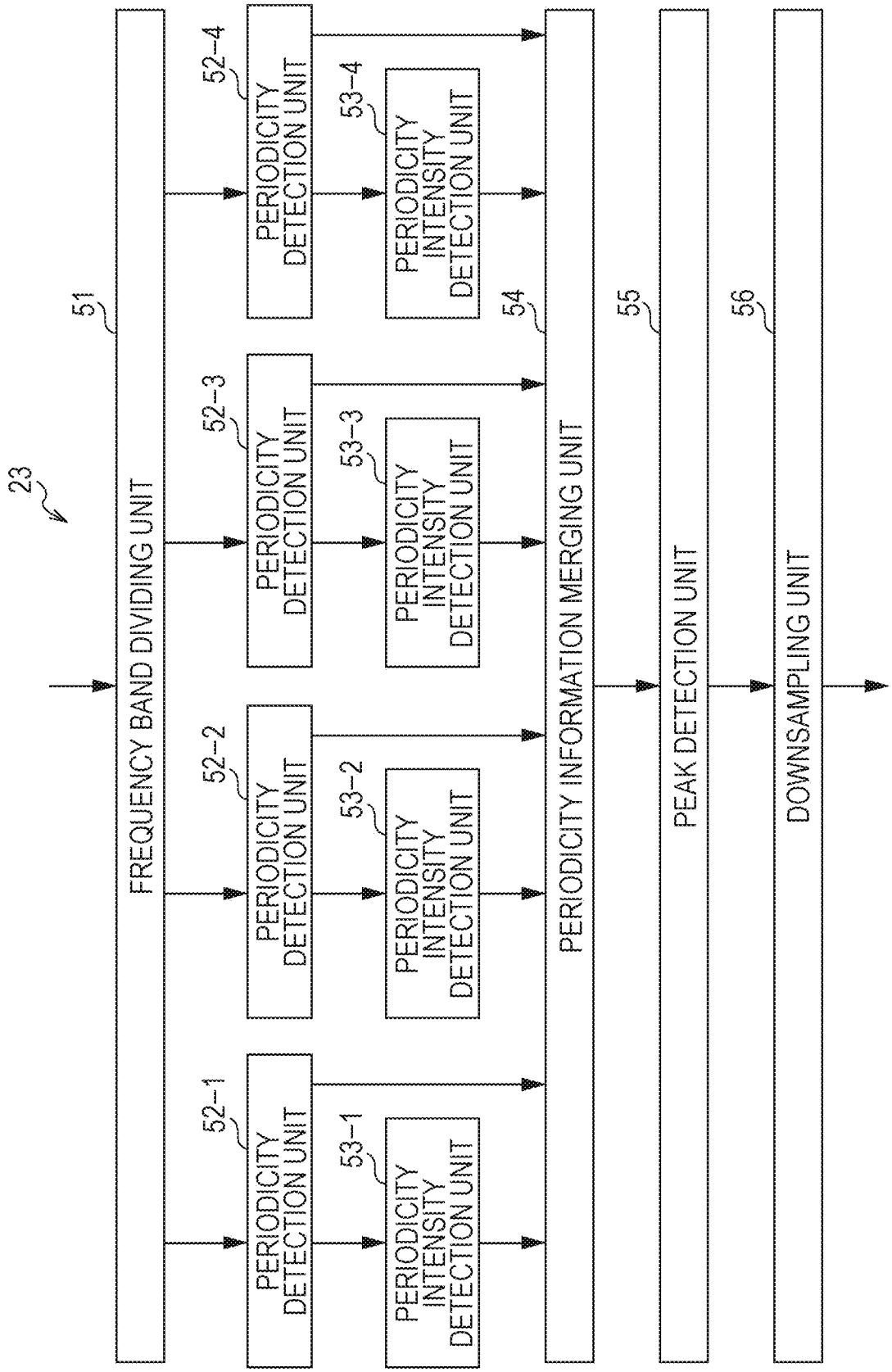
FIG. 2 is a diagram showing a configuration example of a sound synchronization feature amount calculation unit.

More specifically, the sound synchronization feature amount calculation unit 23 shown in FIG. 1 is configured as shown in FIG. 2, for example.

The sound synchronization feature amount calculation unit 23 includes a frequency band dividing unit 51, periodicity detection units 52-1 to 52-4, periodicity intensity detection units 53-1 to 53-4, a periodicity information merging unit 54, a peak detection unit 55, and a downsampling unit 56.

The frequency band dividing unit 51 divides a sound signal, which configures the supplied main channel signal, into time sections from about several tens of msec to about 100 msec by using a window function.

Here, the processing performed from the frequency band dividing unit 51 to the peak detection unit 55 is performed for one time section. It is possible to acquire a plurality of time sections (time frames) that continue in a time direction by shifting a time position, to which the window function is applied, is shifted to be delayed by about several msec to about 100 msec. In contrast, the downsampling unit 56 merges the results of the plurality of continuous time sections into one time section and calculates a feature amount of the new time section after the merging.

The frequency band dividing unit 51 divides a sound signal for each time section into four frequency bands by using a plurality of bandpass filters and supplies the sound signals in the respective frequency bands to the periodicity detection units 52-1 to 52-4.

As the bandpass filters, it is effective to use filters which further expand bandwidths of passing frequency as the frequency becomes higher, such as octave-band filters.

The periodicity detection units 52-1 to 52-4 extract periodicity information indicating periodicity in each time section by calculating an autocorrelation function of the sound signal in each time section in a predetermined frequency band supplied from the frequency band dividing unit 51.

Although an autocorrelation function x(b, tau) itself of a sound signal with a time delay indicated by an index tau in a frequency band indicated by an index b is used as the periodicity information herein, it is also possible to use a value acquired by dividing the autocorrelation function x(b, tau) by x(b, 0). In addition, it is possible to use a method of using a peak of a spectrum acquired by performing discrete Fourier transform on the sound signal in the predetermined frequency band, as a method of calculating the autocorrelation function x(b, tau).

The periodicity detection units 52-1 to 52-4 supplies the extracted periodicity information for each time section to the periodicity intensity detection units 53-1 to 53-4 and the periodicity information merging unit 54. Hereinafter, the periodicity detection units 52-1 to 52-4 will be simply referred to as periodicity detection units 52 when it is not particularly necessary to distinguish the periodicity detection units 52-1 to 52-4.

The periodicity intensity detection units 53-1 to 53-4 calculate intensity of the periodicity in each time section based on the periodicity information for each time section supplied from the periodicity detection units 52-1 to 52-4. Specifically, the maximum value of the autocorrelation function x(b, tau) as frequency information for tau other than those in the vicinity of tau=0 is calculated as the intensity of the periodicity. As the intensity of the periodicity increases, periodicity of the sound signal as a processing target increases. As the intensity of the periodicity decreases, the periodicity of the sound signal as the processing target becomes more likely to be periodicity of noise.

The periodicity intensity detection units 53-1 to 53-4 binarize, as periodicity intensity information for each time section, the intensity of the periodicity in each time section depending on whether a threshold value is exceeded. That is, when the intensity of the periodicity in each time section exceeds the predetermined threshold value, the periodicity intensity information is set to one. When the intensity of the periodicity is equal to or less than the predetermined threshold value, the periodicity intensity information is set to zero. The periodicity intensity detection units 53-1 to 53-4 supply the periodicity intensity information for each time section to the periodicity information merging unit 54.

Hereinafter, the periodicity intensity detection units 53-1 to 53-4 will be simply referred to as periodicity intensity detection units 53 when it is not particularly necessary to distinguish the periodicity intensity detection units 53-1 to 53-4.

The periodicity information merging unit 54 performs periodicity merging processing of merging the periodicity information for each time section based on the periodicity information for each time section, which is supplied from the periodicity detection units 52, and the periodicity intensity information for each time section, which is supplied to the periodicity intensity detection units 53. Specifically, the periodicity information merging unit 54 acquires a sum of the autocorrelation function x(b, tau) as frequency information for time section by using the following Equation (1).

[Math. 1]

$$s(\tau) = \frac{1}{N_p} \sum_{b=1}^{N_b} x(b, \tau) \cdot p(b) \quad (1)$$

In Equation (1), $N_b$ represents the total number of the frequency bands, and p(b) represents periodicity intensity information. In addition, $N_p$ represents the number of frequency bands where p(b) is one.

The periodicity information merging unit 54 supplies the sum S(tau) of the periodicity information for each time section which is acquired as a result of the periodicity merging processing to the peak detection unit 55.

The peak detection unit 55 performs peak detection on the sum S(tau) of the periodicity information, which is supplied from the periodicity information merging unit 54, for each time section and generates peak information P(tau) where a value at a peak position $tau_p$ is one and values at positions other than the peak position $tau_p$ is zero. As a peak detecting method, there is a method of detecting the peak by assuming that an index tau when a differential value of the sum S (tau) of the periodicity information shifts from a positive value to a negative value is at the peak position $tau_p$, for example.

In addition, the peak detection unit 55 may regard peak information $P(tau_p)$ at the peak position $tau_p$ as zero when the sum $S(tau_p)$ of the periodicity information at the peak position $tau_p$ is smaller than a predetermined threshold value. With such a configuration, it is possible to reduce noise in the peak information $P(tau_p)$. In addition, the peak information may be the sum $S(tau_p)$ itself of the periodicity information.

The peak detection unit 55 supplies the peak information $P(\tau)$ for each time section as time-series data of the sound synchronization feature amount in each time section to the downsampling unit 56.

The downsampling unit 56 merges sound synchronization feature amounts in a plurality of time sections, which are supplied from the peak detection unit 55, namely the peak information $P(\tau)$ in the plurality of time sections as information for a new time section and generates peak information $P'_i(\tau)$ as a final sound synchronization feature amount. In other words, the downsampling unit 56 generates the peak information $P'_i(\tau)$ by downsampling the peak information $P(\tau)$.

In $P'_i(\tau)$, tau is an index indicating a time delay, and i is an index indicating a time section. The downsampling unit 56 supplies the peak information $P'_i(\tau)$ in the thus obtained time section as time-series data of the sound synchronization feature amount in each time section to the multiplexing processing unit 24.

Figure 3:
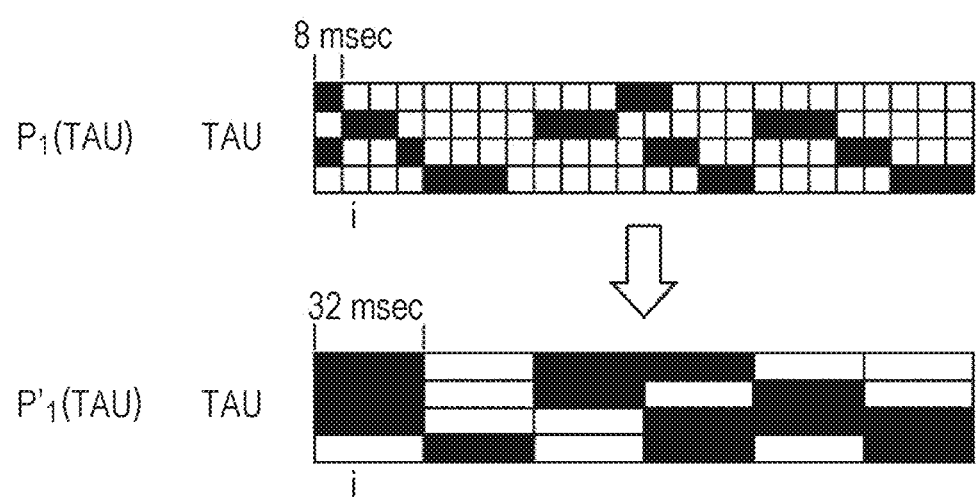
FIG. 3 is a diagram illustrating downsampling of a sound synchronization feature amount.

Here, a description will be given of the generation of the peak information $P'_i(\tau)$ with reference to FIG. 3. In FIG. 3, the vertical axis represents the index tau which indicates a time delay, and the horizontal axis represents an index i which indicates time, namely a time section.

In this example, a series of peak information $P(\tau)$ is shown on the upper side of the drawing, and a series of peak information $P'_i(\tau)$ is shown on the lower side of the drawing. Particularly, a time delay is represented by tau, and peak information $P(\tau)$ in a time section specified by the index i is represented by $P'_i(\tau)$ in FIG. 3. In addition, each square represents peak information in a time section. Particularly, a white square represents that the peak information represented by the square is zero, and a black square represents that the peak information represented by the square is one.

In the drawing, a length of the time section for the peak information $P_i(\tau)$ shown on the upper side is 8 msec. That is, the peak information $P_i(\tau)$ is calculated at a time interval of 8 msec. In addition, four peak information items $P_i(\tau)$ with the same time delay tau, which are adjacent in a time direction (time section direction), are merged into one, and a peak information item $P'_i(\tau)$ is obtained. Accordingly, a time section for each peak information item $P'_i(\tau)$ is 32 msec.

For example, the downsampling unit 56 merges (downsamples) the peak information $P_i(\tau)$ by calculating the following Equation (2) and acquires the peak information $P'_i(\tau)$.

[Math. 2]

$$P_i'(\tau)=P_{4i}(\tau)\cup P_{4i+1}(\tau)\cup P_{4i+2}(\tau)\cup P_{4i+3}(\tau) \qquad (2)$$

In the calculation of Equation (2), a value of the peak information $P'_i(\tau)$ obtained after the merging is regarded as "one" if one or more of the peak information items $P_i(\tau)$ have a value "one" from among the four continuous peak information items $P_i(\tau)$ to be merged. In contrast, a value of the peak information $P'_i(\tau)$ obtained after the merging is regarded as "zero" if all the values of the four continuous peak information items $P_i(\tau)$ to be merged are "zero".

By obtaining a logical sum of the peak information items $P_i(\tau)$ which continue in the time section direction and downsampling the logical sum as described above, it is possible to eliminate a case where information relating to the peak position, which is included in the series of peak information items aligned in the time direction, is removed due to the downsampling. With such a configuration, it is possible to maintain how the position relating to the peak position shifts in a time delay direction even after the downsampling.

For example, when a value of one peak information item $P_i(\tau)$ from among the peak information items $P_i(\tau)$ in the plurality of time sections is simply employed as the value of the peak information $P'_i(\tau)$ after the downsampling for downsampling the peak information $P_i(\tau)$, the information amount is not sufficient, and accuracy of the synchronous calculation deteriorates. That is, the performance deteriorates.

Specifically, if peak information $P_i(\tau)$ is simply thinned as the peak information $P'_i(\tau)$ when the peak position shifts over four time sections, for example, only peak information $P_i(\tau)$ in a time section in the course of the shift is employed as a final feature amount, and the information that the peak position has shifted is lost.

In contrast, according to the aforementioned method of outputting an appropriate value as the peak information $P'_i(\tau)$ based on the peak information $P_i(\tau)$ in the plurality of time sections for the downsampling, it is possible to maintain the information that the shift has occurred in the time section, within a time section after the downsampling. As a result, it is possible to maintain the detection performance even if the downsampling processing is performed.

Furthermore, it is possible to reduce the transmission amount of the sound synchronization feature amounts by performing such downsampling processing. In addition, it is possible to reduce the capacity for maintaining the calculated sound synchronization feature amounts in a memory or a storage device.

Furthermore, it is possible to reduce the computation amount for performing synchronization processing between two sound synchronization feature amounts. Since the computation amount in the synchronization processing increases by $n^2$ times as the length of the input feature amount increases by n times, the effect of downsampling processing is important. In contrast, since the synchronization detection performance deteriorates if thinning processing is simply performed, it is necessary to perform processing of performing downsampling while maintaining necessary information as in the downsampling method by the downsampling unit 56.

Although the example where the peak information as the sound synchronization feature amounts was downsampled into 1/4 was described in FIG. 3, it is also possible to perform the conversion (downsampling) at any other rate such as 1/2 or 1/8.

In addition, a method other than the aforementioned calculation method of Equation (2) can be used for downsampling the peak information.

For example, the value of the peak information $P'_i(\tau)$ after the downsampling may be regarded as "one" when values of the peak information $P_i(\tau)$ in two or more time sections from among the four time sections are "one". Alternatively, the value of the peak information $P'_i(\tau)$ after the downsampling may be regarded as "one" when values of the peak information $P_i(\tau)$ in three or more time sections are "one" or when values of the peak information $P_i(\tau)$ in all the four sections are "one".

Furthermore, the value of the peak information $P'_i(\tau)$ after the downsampling may be regarded as "one" when values of the continuous peak information $P_i(\tau)$ in two or more continuous time sections from among the four time sections are "one" before the downsampling, or the value of the peak information $P'_i(\tau)$ after the downsampling may be regarded as "one" when values of the peak information $P_i(\tau)$ in three or more continuous time sections are "one".

Although the above description was given of the method of downsampling the peak information $P_i(\tau)$ in a time axis direction (time section direction), the peak information $P_i(\tau)$ may be downsampled in a time delay tau direction.

In such a case, the downsampling unit 56 downsamples the peak information $P_i(\tau)$ by calculating the following Equation (3) and obtains the peak information $P'_i(\tau)$.

[Math. 3]

$$P_i'(\tau)=P_i(4\tau)\cup P_i(4\tau+1)\cup P_i(4\tau+2)\cup P_i(4\tau+3) \qquad (3)$$

In calculation of Equation (3), four peak information items $P_i(\tau)$ in the same time section, which are continuously aligned in the time delay tau direction, are merged, and one peak information item $P'_i(\tau)$ is obtained.

At this time, the value of the peak information $P'_i(\tau)$ obtained by the merging is regarded as "one" when one or more values of the peak information $P_i(\tau)$ from among the four continuous peak information items $P_i(\tau)$ to be merged are "one". In contrast, the value of the peak information $P'_i(\tau)$ obtained by the merging is regarded as "zero" when all the values of the four continuous peak information items $P_i(\tau)$ to be merged are "zero".

Furthermore, the peak information $P_i(\tau)$ may be downsampled in both the time section i direction and the time delay tau direction.

In such a case, the downsampling unit 56 downsamples the peak information $P_i(\tau)$ by calculating the following Equation (4) and obtains the peak information $P'_i(\tau)$.

[Math. 4]

$$P_i'(\tau)=P_{2i}(2\tau)\cup P_{2i+1}(2\tau)\cup P_{2i}(2\tau+1)\cup P_{2i+1}(2\tau+1) \qquad (4)$$

In the calculation of Equation (4), the total of four peak information items $P_i(\tau)$ including the two peak information items $P_i(\tau)$ with the same time difference tau, which are continuously aligned in the time section i direction, and two peak information items $P_i(\tau)$ which are aligned so as to be adjacent to the above two peak information items $P_i(\tau)$ in the time delay tau direction are merged, and one peak information item $P'_i(\tau)$ is obtained.

At this time, the value of the peak information $P'_i(\tau)$ obtained by the merging is regarded as "one" when one or more values of the peak information $P_i(\tau)$ from among the four peak information items $P_i(\tau)$ to be merged are "one". In contrast, the value of the peak information $P'_i(\tau)$ obtained by the merging is regarded as "zero" when all the values of the four peak information items $P_i(\tau)$ to be merged are "zero".

The downsampling unit 56 obtains the peak information $P'_i(\tau)$ by downsampling the peak information $P(\tau)$ and supplies the peak information $P'_i(\tau)$ for each newly obtained time section as time-series data of the sound synchronization feature amount for each time section to the multiplexing processing unit 24.

<Configuration Example of Content Reproduction System>

Next, a description will be given of a configuration of a content reproduction system which receives a main transmission signal and a sub transmission signal transmitted from the providing apparatus 11 as a main received signal and a sub received signal, respectively, and reproduces main content and sub content. Such a content reproduction system is configured as shown in FIG. 4, for example.

Figure 4:
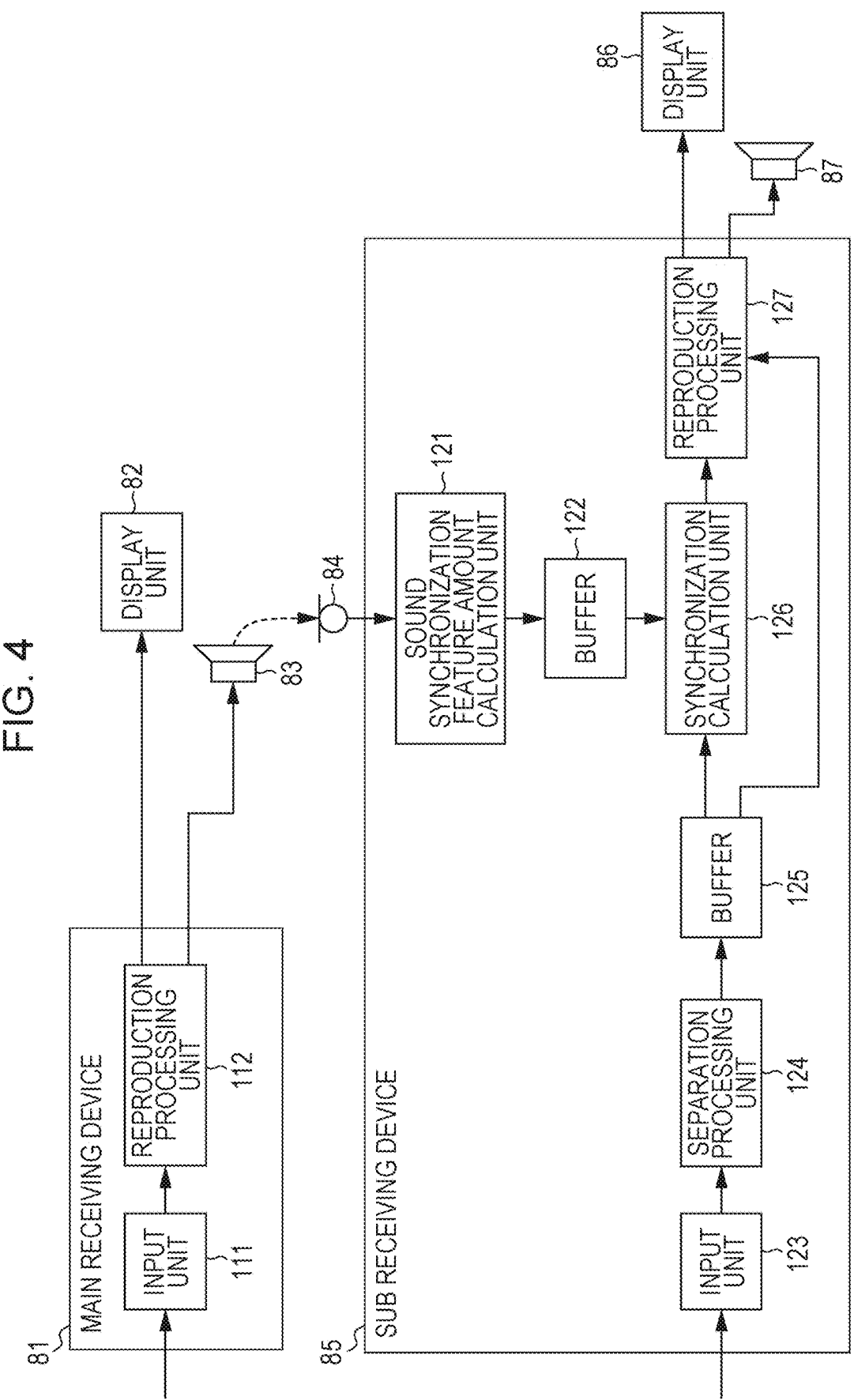
FIG. 4 is a diagram showing a configuration example of a content reproduction system.

The content reproduction system shown in FIG. 4 includes a main receiving device 81, a display unit 82, a speaker 83, a microphone 84, a sub receiving device 85, a display unit 86, and a speaker 87. Although a case where the content reproduction system is configured of a plurality of apparatuses is shown here, the content reproduction system may be configured of a single apparatus.

The main receiving device 81 receives the main received signal transmitted from the providing apparatus 11 and controls reproduction of the main content which is obtained from the main received signal.

The main receiving device 81 includes an input unit 111 and a reproduction processing unit 112.

The input unit 111 receives the main transmission signal transmitted from the providing apparatus 11 as the main received signal and supplies the main received signal to the reproduction processing unit 112. The reproduction processing unit 112 extracts an image signal and a sound signal of the main content, which are included in the main received signal supplied from the input unit 111, supplies the image signal to the display unit 82, causes the display unit 82 to reproduce the image signal, supplies the sound signal to the speaker 83, and causes the speaker 83 to reproduce the sound signal. That is, the reproduction processing unit 112 controls reproduction of the main content.

The display unit 82 is configured of a liquid crystal display device, for example, and displays an image (video) of the main content based on the image signal supplied from the reproduction processing unit 112. The speaker 83 is a sound reproduction apparatus and outputs sound of the main content based on the sound signal supplied from the reproduction processing unit 112.

The microphone 84 collects sound of the main content output from the speaker 83 and supplies the sound signal acquired as a result to the sub receiving device 85.

The sub receiving device 85 receives the sub transmission signal transmitted from the providing apparatus 11 as a sub received signal and controls reproduction of sub content obtained from the sub received signal.

The sub receiving device 85 includes a sound synchronization feature amount calculation unit 121, a buffer 122, an input unit 123, a separation processing unit 124, a buffer 125, a synchronization calculation unit 126, and a reproduction processing unit 127.

The sound synchronization feature amount calculation unit 121 calculates a sound synchronization feature amount from the sound signal supplied from the microphone 84 and supplies the sound synchronization feature amount to the buffer 122. The buffer 122 temporarily records the sound synchronization feature amount supplied from the sound synchronization feature amount calculation unit 121.

The input unit 123 receives the sub received signal transmitted from the providing apparatus 11 and supplies the sub received signal to the separation processing unit 124. The separation processing unit 124 separates the sub received signal supplied from the input unit 123 into a sound synchronization feature amount and a sub channel signal and supplies the sound synchronization feature amount and the sub channel signal to the buffer 125. The buffer 125 temporarily records the sound synchronization feature amount and the sub channel signal supplied from the separation processing unit 124.

The synchronization calculation unit 126 generates synchronization correction information depending on a sound feature amount for synchronizing the main content and the sub content based on the sound synchronization feature amount recorded in the buffer 122 and the sound synchronization feature amount recorded in the buffer 125 and supplies the synchronization correction information to the reproduction processing unit 127. That is, the synchronization calculation unit 126 detects deviation in reproduction time between the main content and the sub content by matching processing between the sound synchronization feature amount extracted from the sound signal obtained by sound collection and the sound synchronization feature amount included in the sub received signal, and generates the synchronization correction information based on the sound feature amount which indicates the deviation.

The reproduction processing unit 127 corrects a reproduction timing (time) of the sub channel signal, which is recorded in the buffer 125, based on the synchronization correction information supplied from the synchronization calculation unit 126 and supplies an image signal and a sound signal as a sub channel signal to the display unit 86 and the speaker 87, respectively. That is, the reproduction processing unit 127 controls reproduction of the sub content. For example, when the sound synchronization feature amount is handled as a media object and is synchronized and multiplexed with a media object of the sub channel signal by using a MPEG-4 system, a time attribute is defined for each access unit (AU) as a minimum unit of each media object, and therefore, it is possible to calculate an appropriate reproduction timing (time) of the media object of the sub channel signal from the aforementioned synchronization correction information.

The display unit 86 is configured of a liquid crystal display apparatus, for example, and displays an image (video) of the sub content based on the image signal supplied from the reproduction processing unit 127. The speaker 87 is a sound reproduction apparatus and outputs sound of the sub content based on the sound signal supplied from the reproduction processing unit 127.

<Configuration Example of Sound Synchronization Feature Amount Calculation Unit>

Figure 5:
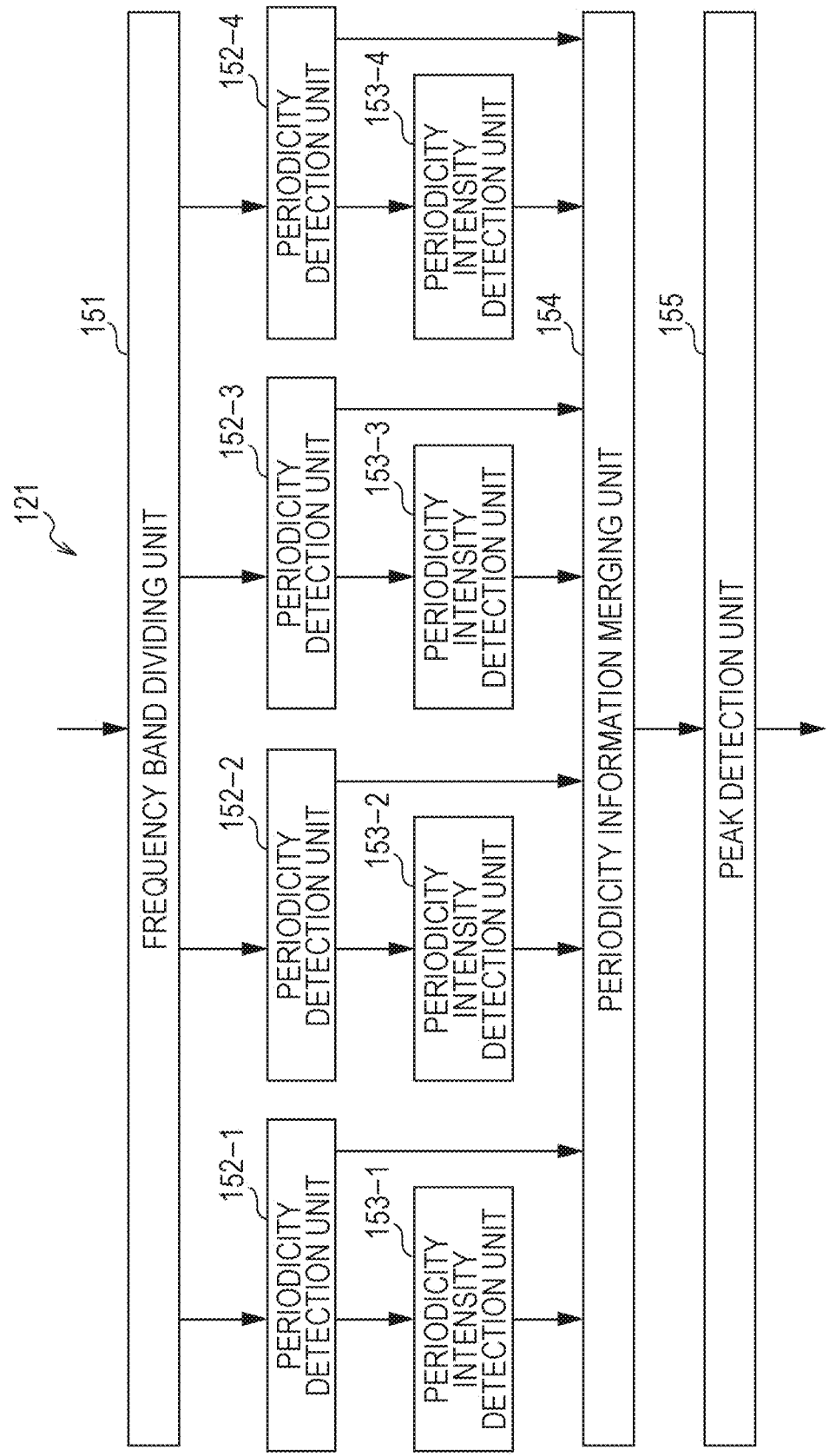
FIG. 5 is a diagram showing a configuration example of a sound synchronization feature amount calculation unit.

More specifically, the calculation unit 121 shown in FIG. 4 is configured as shown in FIG. 5, for example.

The sound synchronization feature amount calculation unit 121 includes a frequency band dividing unit 151, periodicity detection units 152-1 to 152-4, periodicity intensity detection units 153-1 to 153-4, a periodicity information merging unit 154, and a peak detection unit 155.

In addition, since the frequency band dividing units 151 to the peak detection unit 155 are the same as the frequency band dividing unit 51 to the peak detection unit 55 shown in FIG. 2, the descriptions thereof will be omitted. However, it is also possible to set a shift time of the window function to different values for the frequency band dividing unit 151 and the frequency band dividing unit 51. For example, when the sub receiving device 85 has sufficient computation resource, it is possible to extract a sound synchronization feature amount with finer granularity by using a shorter shift time by the frequency band dividing unit 151.

Hereinafter, the periodicity detection units 152-1 to 152-4 will be simply referred to as periodicity detection units 152 when it is not particularly necessary to distinguish the periodicity detection units 152-1 to 152-4, and the periodicity intensity detection units 153-1 to 153-4 will be referred to as periodicity intensity detection units 153 when it is not particularly necessary to distinguish the periodicity intensity detection units 153-1 to 153-4.

<Configuration Example of Synchronization Calculation Unit>

Figure 6:
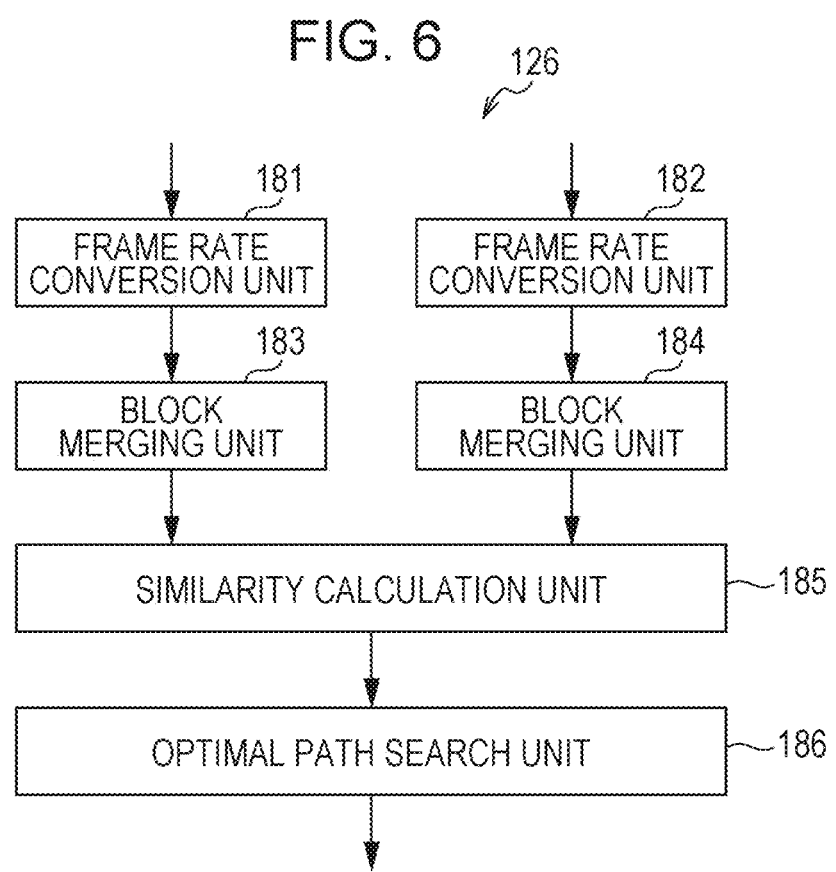
FIG. 6 is a diagram showing a configuration example of a synchronization calculation unit.

More specifically, the synchronization calculation unit 126 shown in FIG. 4 is configured as shown in FIG. 6, for example.

The synchronization calculation unit 126 shown in FIG. 6 includes a frame rate conversion unit 181, a frame rate conversion unit 182, a block merging unit 183, a block merging unit 184, a similarity calculation unit 185, and an optimal path search unit 186.

The frame rate conversion unit 181 reads time-series data of the sound synchronization feature amount for each time section of the main content from the buffer 122, converts the frame rate of the sound synchronization feature amount, and supplies the sound synchronization feature amount with a converted frame rate to the block merging unit 183. The frame rate described herein represents the number of time sections per a unit time in the time-series data of the sound synchronization feature amount, namely the length of the time section.

The frame rate conversion unit 182 reads the time-series data of the sound synchronization feature amount for each time section of the main content from the buffer 125, converts the frame rate of the sound synchronization feature amount, and supplies the sound synchronization feature amount with the converted frame rate to the block merging unit 184.

The sound synchronization feature amounts maintained in the buffer 122 and the buffer 125, respectively have different frame rates, namely different lengths of time sections in some cases.

For example, a case where the sound synchronization feature amount included in the sub transmission signal is set to have a low rate in order to reduce a transfer bit rate of the sub content (sub transmission signal) provided from the providing apparatus 11 while the sound synchronization feature amount calculated from the sound collected by the microphone 84 is set to have a high rate, since it is not necessary to transfer the sound synchronization feature amount, can be considered.

Figure 7:
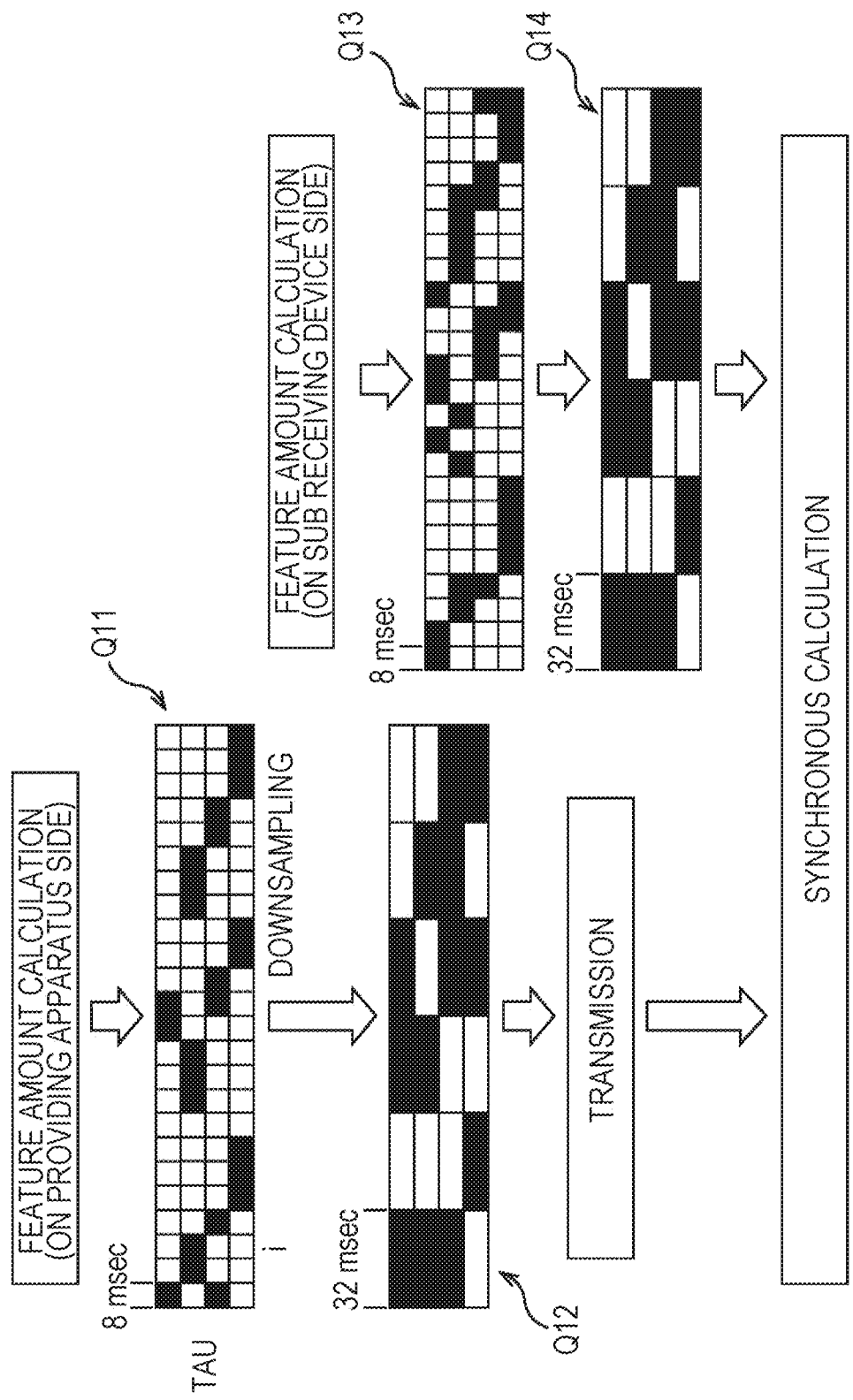
FIG. 7 is a diagram illustrating synchronous calculation of a sound synchronization feature amount.

In such a case, it is possible to consider to downsample the sound synchronization feature amount calculated from the sound collected by the microphone 84 by the same method as that of the downsampling unit 56 as shown in FIG. 7, for example. In addition, the vertical axis of the peak information as the sound synchronization feature amount represented by each of the arrows Q11 to Q14 in FIG. 7 represents time delay tau, and the horizontal axis represents a time section i. In addition, a square represents peak information in a time section.

In this example, the peak information as the sound synchronization feature amount is acquired as represented by the arrow Q11, is then downsampled on the side of the providing apparatus 11, and is transmitted as peak information in a longer time section represented by the arrow Q12 to the sub receiving device 85. Here, peak information in a time section corresponding to 8 msec is subjected to the frame rate conversion (downsampling) to obtain peak information in a time section corresponding to 32 msec.

In contrast, the sound synchronization feature amount calculation unit 121 in the sub receiving device 85 calculates a sound synchronization feature amount from the sound signal acquired by collecting sound of the main content reproduced by the main receiving device 81, and obtains the peak information represented by the arrow Q13 as the sound synchronization feature amount as a result. Here, the peak information represented by the arrow Q13 is calculated for each time section corresponding to 8 msec.

The sound synchronization feature amount acquired as described above by the sound synchronization feature amount calculation unit 121 and the sound synchronization feature amount received from the providing apparatus 11 have different lengths of time sections, namely different frame rates. Thus, the frame rate conversion unit 181 performs downsampling, as frame rate conversion, on the sound synchronization feature amount acquired by the sound synchronization amount calculation unit 121 such that the frame rates of the sound synchronization feature amounts coincide with each other, and acquires the peak information as the sound synchronization feature amount represented by the arrow Q14. The sound synchronization feature amount represented by the arrow Q14 is peak information in a time section of 32 msec.

After the frame rates (the lengths of the time sections) are made to coincide with each other, the sound synchronization feature amount is used to perform synchronous calculation. By downsampling the sound synchronization feature amount on the side of the sub receiving device 85 as described above, it is possible to handle an arbitrary frame rate (bit rate).

In addition, there is also a case where the sound synchronization feature amount transmitted to the sub receiving device 85 has a high rate while the sound synchronization feature amount calculated from the sound collected by the microphone 84 has a low rate. For example, there is a case where the computation resource of the sub receiving device 85 is not sufficient and the frame shift amount is increased in order to reduce the computation amount necessary for calculating the sound synchronization feature amount.

Figure 8:
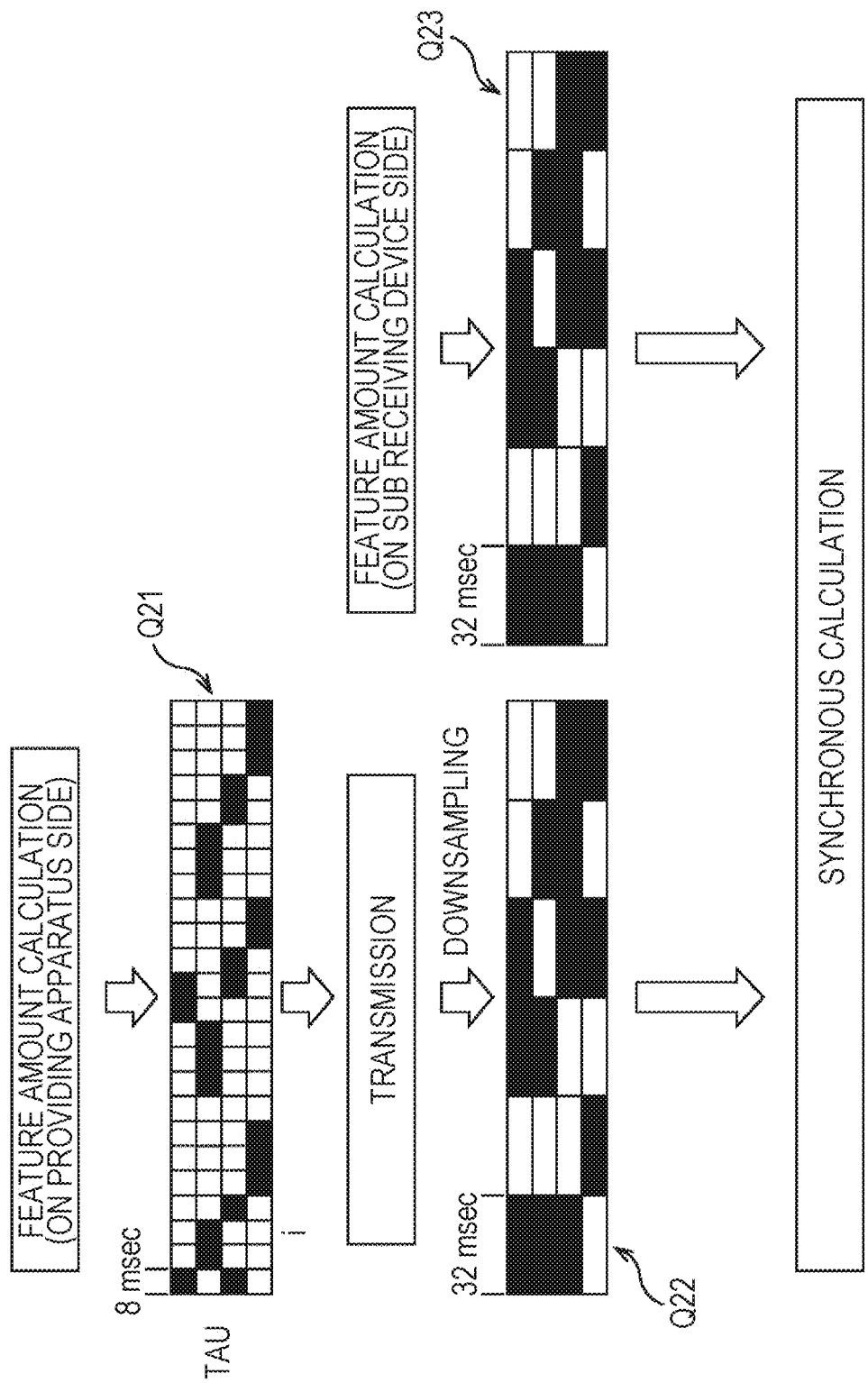
FIG. 8 is a diagram illustrating synchronous calculation of a sound synchronization feature amount.

In such a case, the frame rate of the sound synchronization feature amount included in the sub transmission signal, which is represented by the arrow Q21 in FIG. 8, for example, is downsampled by the frame rate conversion unit 182 by using the same method as that of the downsampling unit 56, and the sound synchronization feature amount represented by the arrow Q22 is acquired. In FIG. 8, the vertical axis of the peak information as the sound synchronization feature amount represented by each of the arrows Q21 to Q23 represents time delay tau, and the horizontal axis thereof represents a time section i. In addition, a square represents peak information in a time section.

In this example, peak information in a time section of 8 msec is subjected to the frame rate conversion (downsampling) to acquire peak information in a time section of 32 msec.

In addition, the sound synchronization feature amount calculation unit 121 in the sub receiving device 85 calculates a sound synchronization feature amount from the sound signal acquired by collecting the sound of the main content reproduced by the main receiving device 81, and the peak information represented by the arrow Q23 is acquired as the sound synchronization feature amount as a result. Here, the peak information represented by the arrow Q23 is calculated for each time section of 32 msec.

The frame rate of the sound synchronization feature amount included in the sub transmission signal and the frame rate of the sound synchronization feature amount calculated by the sub receiving device 85 may be made to coincide with each other by downsampling the sound synchronization feature amount included in the sub transmission signal as described above.

Furthermore, although the frame rates were made to coincide with each other by downsampling the sound synchronization feature amount with a higher frame rate in the above description, the frame rates may be made to coincide with each other by upsampling the sound synchronization feature amount with a lower frame rate.

Figure 9:
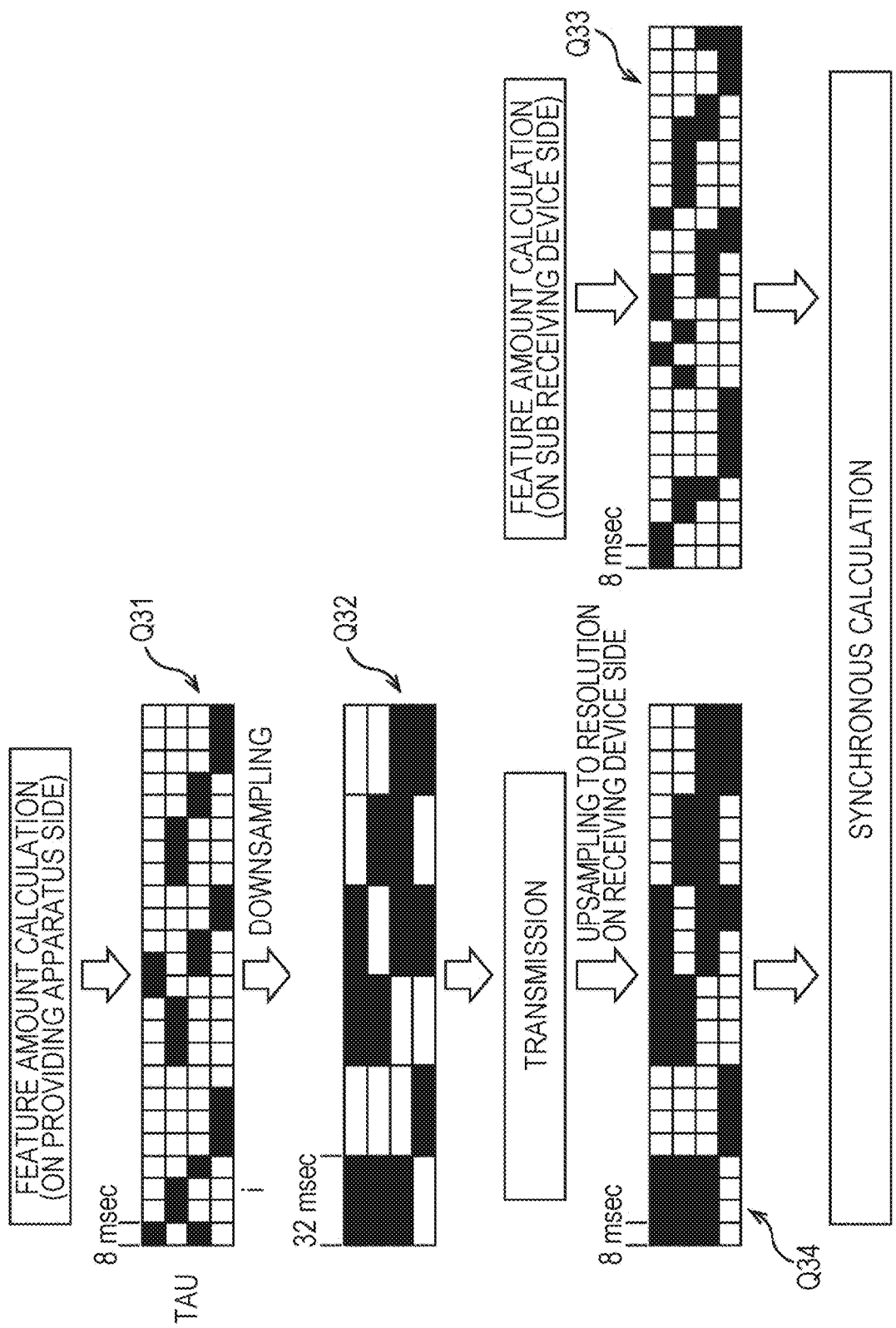
FIG. 9 is a diagram illustrating synchronous calculation of a sound synchronization feature amount.

In such a case, the frame rate of the sound synchronization feature amount included in the sub transmission signal is upsampled by the frame rate conversion unit 182 as shown in FIG. 9, for example. In FIG. 9, the vertical axis of the peak information as the sound synchronization feature amount represented by each of the arrows Q31 to Q34 represents time delay tau, and the horizontal axis thereof represents a time section i. In addition, a square represents peak information in a time section.

In this example, the peak information as the sound synchronization feature amount is acquired as represented by the arrow Q31, is then downsampled on the side of the providing apparatus 11, and is transmitted as peak information in a longer time section to the sub receiving device 85, as represented by the arrow Q32. Here, peak information in a time section of 8 msec is subjected to the frame rate conversion (downsampling) to acquire peak information in a time section of 32 msec.

In contrast, the sound synchronization feature amount calculation unit 121 in the sub receiving device 85 calculates a sound synchronization feature amount from the sound signal acquired by collecting the sound of the main content reproduced by the main receiving device 81, and acquires the peak information represented by the arrow Q33 as the sound synchronization feature amount as a result. Here, the peak information represented by the arrow Q33 is calculated for each time section of 8 msec.

In this example, the frame rates of the sound synchronization feature amount calculated by the sound synchronization feature amount calculation unit 121 and the sound synchronization feature amount received from the providing apparatus 11 do not coincide with each other.

Thus, the frame rate conversion unit 182 uniformizes time synchronization granularity of the sound synchronization feature amounts used for the synchronous calculation by upsampling the peak information as the sound synchronization feature amount received from the providing apparatus 11 and calculating the peak information in the time section of 8 msec, which is represented by the arrow Q34. For example, the frame rate conversion unit 182 upsamples the peak information obtained by calculating the following Equation (5).

[Math. 5]

$$P_{4i}(\tau)=P_i'(\tau)$$

$$P_{4i+1}(\tau)=P_i'(\tau)$$

$$P_{4i+2}(\tau)=P_i'(\tau)$$

$$P_{4i+3}(\tau)=P_i'(\tau) \qquad (5)$$

In the calculation of Equation (5), the a value of a peak information item P'i(tau) before the upsampling, which has the same time delay tau and has the same positional relationship with four peak information items Pi(tau) after the upsampling that are adjacent in the time direction (time section direction) is regarded as a value of each of the four peak information items Pi(tau) after the upsampling, without any change.

By appropriately upsampling the sound synchronization feature amount used for the synchronous calculation in accordance with the higher frame rate as described above, it is possible to realize synchronization accuracy with supposedly high resolution.

Furthermore, it is also possible to downsample both the sound synchronization feature amount included in the sub transmission signal and the sound synchronization feature amount calculated by the sound synchronization feature amount calculation unit 121 in order to reduce the computation resource in the sub receiving device 85.

By providing the frame rate conversion unit 181 and the frame rate conversion unit 182 as described above, it is possible to synchronize sound synchronization feature amounts with different frame rates. In addition, it is possible to designate various frame rates in accordance with the computation resource, the transmission band, and the like, and to enhance flexibility of the system.

Returning to the explanation of FIG. 6, the block merging unit 183 receives the supply of the time-series data of the sound synchronization feature amount in each time section of the main content from the frame rate conversion unit 181, and performs merging in units of blocks while regarding a plurality of (sixty-four, for example) continuous time sections as a block. The block merging unit 183 supplies the time-series data of the sound synchronization feature amounts in units of blocks to the similarity calculation unit 185.

The block merging unit 184 receives the supply of the time-series data of the sound synchronization feature amount in each time section of the main content from the frame rate conversion unit 182, and performs the merging in units of blocks while regarding a plurality of (sixty-four, for example) continuous time sections as a block. The block merging unit 184 supplies the time-series data of the sound synchronization feature amounts in units of blocks to the similarity calculation unit 185.

In addition, the plurality of time sections which configure a block are not necessarily continuous time sections. For example, a plurality of even time sections can be regarded as one block, and a plurality of odd time sections can be regarded as one block. In such a case, it is possible to perform thinning processing on the time-series data of the sound synchronization feature amount for each time section and to thereby reduce the computation amount.

The similarity calculation unit 185 calculates similarity between time-series data items of the sound synchronization feature amounts in units of blocks, which are supplied from the block merging unit 183 and the block merging unit 184, and generates a similarity matrix which shows similarity between the blocks. The similarity calculation unit 185 supplies the similarity matrix to the optimal path search unit 186.

The optimal path search unit 186 searches for a path with an optimal similarity from the similarity matrix supplied from the similarity calculation unit 185, and generates information indicating a time difference between two blocks corresponding to the similarity on the path as synchronization correction information based on a sound feature amount. Then, the optimal path search unit 186 supplies the synchronization correction information based on the sound feature amount to the reproduction processing unit 127.

As described above, the synchronization calculation unit 126 generates the synchronization correction information depending on the sound feature amount based on the pitch information of the sound signal. Accordingly, it is possible to generate the synchronization correction information based on the sound feature amount in a robust manner even in a case where different noise is included in each sound signal.

That is, when a human hears a plurality of sounds with frequency characteristics, the human can easily recognize a common component even if noise is included in the sounds by recognizing a sound with the same basic frequency, that is, by recognizing a sound with the same pitch. The present technology is achieved in consideration of such a fact, and the synchronization correction information is generated in a robust manner with respect to noise by generating the synchronization correction information based on the pitch information.

<Concerning Similarity Calculation and Search for Path with Optimal Similarity>

Here, descriptions concerning similarity calculation and search for a path with optimal similarity will be given.

Figure 10:
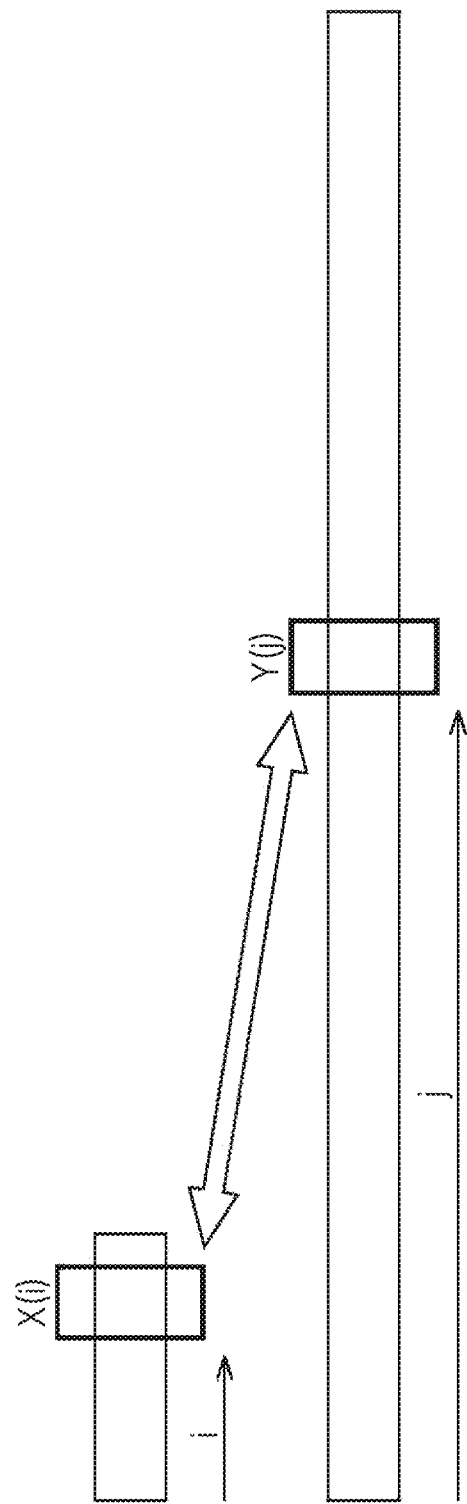
FIG. 10 is a diagram illustrating blocks as targets of similarity calculation.

FIG. 10 is a diagram illustrating blocks as targets of the similarity calculation.

In FIG. 10, i is an index of a block of the sound synchronization feature amounts acquired by the sound synchronization feature amount calculation unit 121, and j is an index of a block of the sound synchronization feature amounts included in the sub received signal. More specifically, although these sound synchronization feature amounts are appropriately subjected to the frame rate conversion by the frame rate conversion unit 181 or the frame rate conversion unit 182, the description of the similarity calculation will be continued on the assumption that the frame rate conversion is not performed herein in order to simplify the explanation.

In addition, X(i) represents time-series data of the sound synchronization feature amounts in the block with the index j from among the sound synchronization feature amounts acquired by the sound synchronization feature amount calculation unit 121, and Y(j) represents time-series data of the sound synchronization feature amounts in the block with the index j from among the sound synchronization feature amounts included in the sub received signal.

As shown in FIG. 10, the targets of the similarity calculation are n×m combinations between each of n X(i) and m Y(j).

Figure 11:
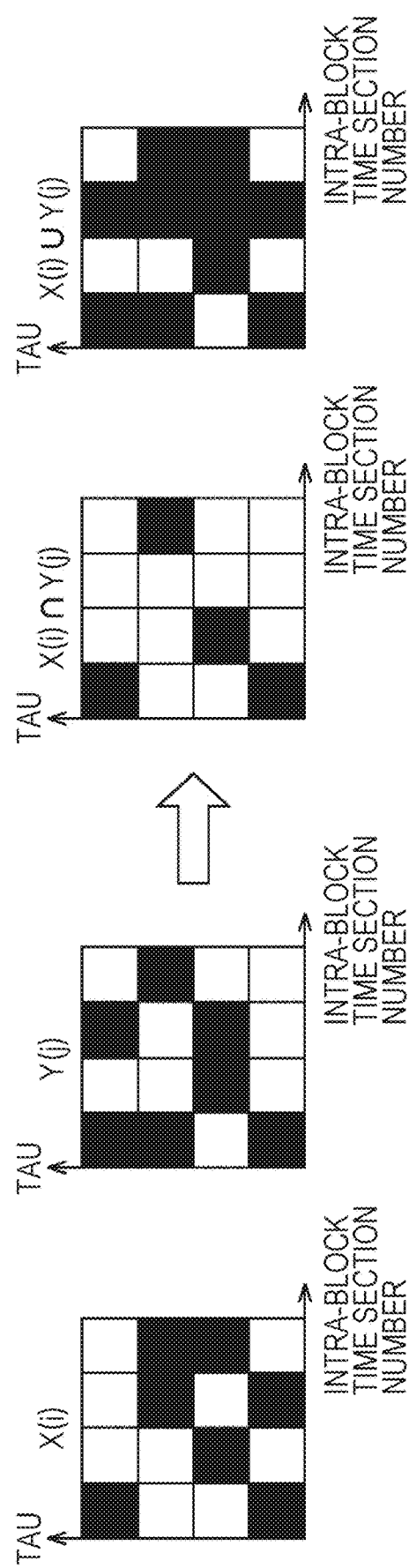
FIG. 11 is a diagram illustrating the similarity calculation.

FIG. 11 is a diagram illustrating a method of calculating similarity.

In the matrix in FIG. 11, the horizontal axis represents an intra-block time section number which represents the number from the top time section in the block, and the vertical axis represents an index tau. In addition, a white square represents that time-series data P(tau) of the sound synchronization feature amounts with the index tau in a time section with a corresponding intra-block time section number is zero, and a black square represents that the time-series data P(tau) is one. Furthermore, the number of time sections configuring a block is four, and tau is from zero to three in the example of FIG. 11.

When similarity between X(i) and Y(j) is calculated as shown in FIG. 11, first, a logical product X(i) cap Y(j) between X(i) and Y(j) is calculated, and a logical sum X(i) cup Y(j) between X (i) and Y(j) is then calculated. When, similarity between X(i) and Y(j), each of which is configured of nine 0s and seven 1s, is calculated as shown in FIG. 11, first, a logical product of X(i) cap Y(j), which is configured of twelve 0s and four 1s, is calculated, and a logical sum of X(i) cup Y(j), which is configured of six 0s and ten 1s, is then calculated.

Then, by the following Equation (6), similarity A (i, j) between X(i) and Y(j) is calculated based on a Number (X(i) cap Y(j)) which is the number of is in the logical product X(i) cap Y(j) and a Number (X(i) cap Y(j)) which is the number of is in the logical sum.

[Math. 6]

$$A(i,j) = \text{Number}(X(i) \cap Y(j)) / \text{Number}(X(i) \cup Y(j)) \qquad (6)$$

In the example of FIG. 11, the Number (X(i) cap Y(j)) is four, the Number (X(i) cup Y(j)) is ten, and therefore, the similarity A(i,j) is 0.4.

When the sum S (tau) of the periodicity information is employed as the time-series data of the sound synchronization feature amounts, it is possible to employ a method of calculating similarity by using a cosine distance as a method of calculating the similarity.

In addition, the similarity matrix is information which represents similarity A(i, j) at each point corresponding to the index i and the index j, where the horizontal axis represents the index j and the vertical axis represents the index i.

The optimal path search unit 186 searches for a path with similarity, an integrated value of which on the similarity matrix is maximized, as a path with an optimal similarity by using a dynamic programming method. The optimal path search unit 186 generates a different i-j of the indexes corresponding to the similarity on the path with the optimal similarity as synchronization correction information based on the sound feature amount.

<Explanation of Transmission Processing>

Next, a description will be given of an operation of the providing apparatus 11.

When a main channel signal and a sub channel signal which are mutually time-synchronized are supplied, the providing apparatus 11 performs transmission processing and transmits a main transmission signal and a sub transmission signal. Hereinafter, a description will be given of the transmission processing by the providing apparatus 11 with reference to the flowchart in FIG. 12.

In Step S11, the sound synchronization feature amount calculation unit 23 performs sound synchronization feature amount calculation processing to calculate a sound synchronization feature amount from a sound signal configuring the supplied main channel signal, and supplies the sound synchronization feature amount to the multiplexing processing unit 24.

A detailed description of the sound synchronization feature amount calculation amount will be given later.

In Step S12, the conversion unit 21 generates a main transmission signal by converting the supplied main channel signal into a signal in a predetermined transmission format defined by the system, and supplies the obtained main transmission signal to the output unit 22.

In Step S13, the output unit 22 transmits the main transmission signal supplied from the conversion unit 21.

In Step S14, the multiplexing processing unit 24 performs multiplexing processing between the sound synchronization feature amount and the sub channel signal, and supplies the sub transmission signal obtained as a result to the output unit 25.

For example, the multiplexing processing unit 24 multiplexes the sound synchronization feature amount and the sub channel signal in the transmission format defined by the system such that a time-synchronized relationship between the sound synchronization feature amount from the sound synchronization feature amount calculation unit 23 and the supplied sub channel signal is satisfied, by using the supplied main channel signal.

Figure 13:
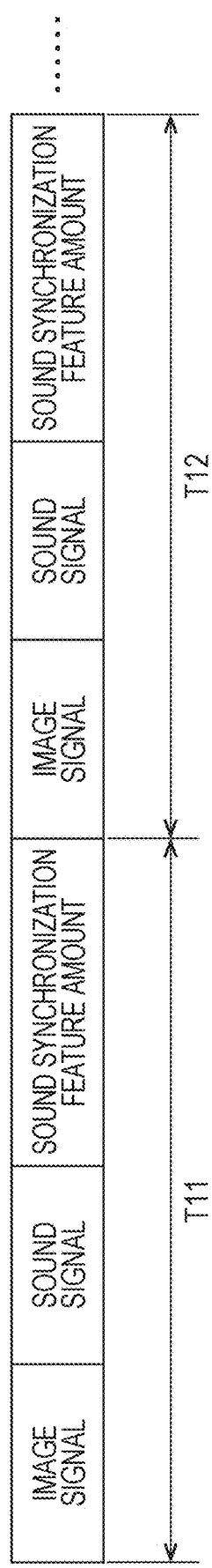
FIG. 13 is a diagram illustrating multiplexing of a sub channel signal and a sound synchronization feature amount.

With such a configuration, the sub transmission signal shown in FIG. 13, for example, is acquired.

In the example of FIG. 13, each of the section T11 and the section T12 in a bit stream as the sub transmission signal includes an image signal, a sound signal, and a sound synchronization feature amount in one frame.

For example, the image signal and the sound signal included in the section T11 correspond to a sub channel signal in one frame, and the sound synchronization feature amount included in the section T11 is a sound synchronization feature amount which is extracted from a main channel signal in a frame, which temporally corresponds to the sub channel signal. As described above, the sub channel signal and the sound synchronization feature amount in the same frame are associated and multiplexed in the sub transmission signal, and it is possible to specify the sound synchronization feature amount corresponding to the sub channel signal in each frame on the receiving side of the sub transmission signal.

Figure 12:
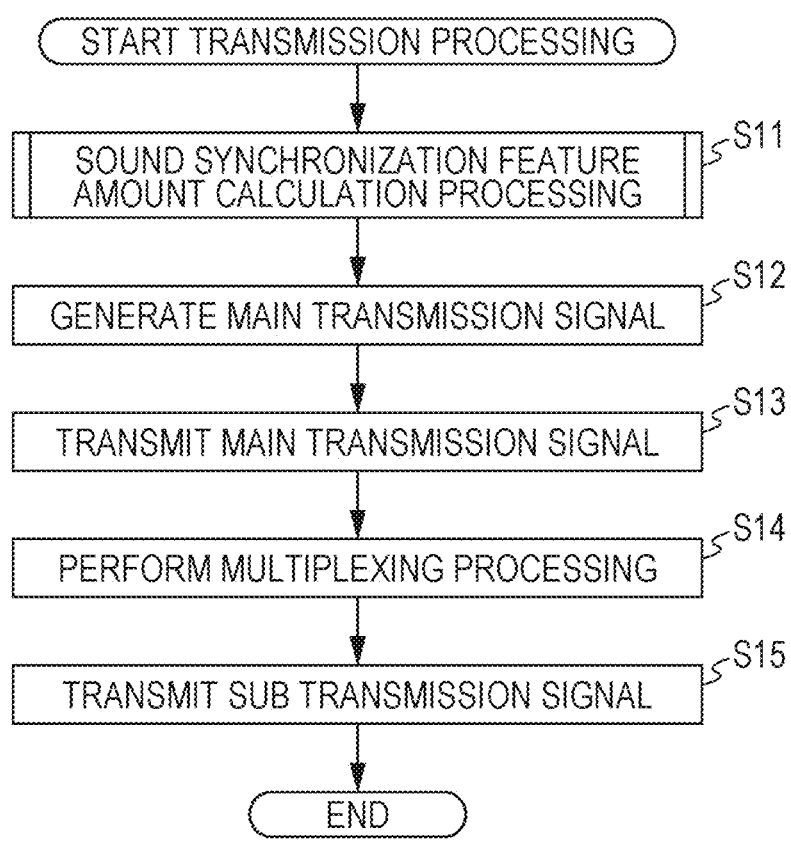
FIG. 12 is a flowchart illustrating transmission processing.

Returning to the explanation of the flowchart in FIG. 12, the output unit 25 transmits the sub transmission signal supplied from the multiplexing unit 24 in Step S15 and completes the transmission processing.

As described above, the providing apparatus 11 generates the sub transmission signal by associating and multiplexing the sound synchronization feature amount acquired from the main channel signal with the sub channel signal and transmits the sub transmission signal and the main transmission signal.

By associating and transmitting the sound synchronization feature amount with the sub channel signal as described above, it is possible to reproduce the main content and the sub content while maintaining synchronization, by using the sound synchronization feature amounts even in a case where the main channel signal and the sub channel signal are received by a plurality of different devices through different transmission paths, on the receiving side.

<Explanation of Sound Synchronization Feature Amount Calculation Processing>

Next, a description will be given of sound synchronization feature amount calculation processing corresponding to the processing in Step S11 in FIG. 12 with reference to the flowchart in FIG. 14.

In Step S41, the frequency band dividing unit 51 divides a supplied sound signal into time sections from about several tens of msec to about a hundred msec by using a window function.

In Step S42, the frequency band dividing unit 51 divides a sound signal in each time section into four frequency bands by using a plurality of bandpass filters. The frequency band dividing unit 51 supplies the sound signals in the respective frequency bands to the respective periodicity detection units 52-1 to 52-4.

In Step S43, each periodicity detection unit 52 extracts periodicity information for each time section by calculating an autocorrelation function x(b, tau) of the sound signal in each time section in a predetermined frequency band, which is supplied from the frequency band dividing unit 51, and supplies the periodicity information to the periodicity intensity detection unit 53 and the periodicity information merging unit 54. In addition, the processing in Step S43 is performed by each of the periodicity detection units 52.

In Step S44, the periodicity intensity detection unit 53 calculates intensity of periodicity for each time section based on the periodicity information for each time section, which is supplied from the periodicity detection unit 52. Then, the periodicity intensity detection unit 53 generates periodicity intensity information for each time section by binarizing the periodicity intensity for each time section depending on whether or not the intensity exceeds a threshold value, and supplies the periodicity intensity information to the periodicity information merging unit 54. In addition, the processing in Step S44 is performed by each of the periodicity intensity detection units 53.

In Step S45, the periodicity information merging unit 54 performs periodicity merging processing by using the aforementioned Equation (1) based on the periodicity information for each time section, which is supplied from the periodicity detection unit 52, and the periodicity intensity information for each time section, which is supplied from the periodicity intensity detection unit 53. The periodicity information merging unit 54 supplies a sum S(tau) of the periodicity information for each time section, which is acquired as a result of the periodicity merging processing, to the peak detection unit 55.

In Step S46, the peak detection unit 55 performs peak detection on the sum S(tau) of the periodicity information, which is supplied from the periodicity information merging unit 54, for each time section, generates peak information P(tau), and supplies the peak information P(tau) to the downsampling unit 56.

In Step S47, the downsampling unit 56 performs downsampling processing on the peak information by merging the peak information P(tau) in a plurality of time sections, which is supplied from the peak detection unit 55, into peak information in one time section.

The downsampling unit 56 supplies the peak information for each time section acquired as described above, as time-series data of the sound synchronization feature amount for each time section, to the multiplexing processing unit 24 and completes the sound synchronization feature amount calculation processing. If the sound synchronization feature amount calculation processing is completed, then the processing proceeds to Step S12 in FIG. 12.

The sound synchronization feature amount calculation unit 23 calculates the sound synchronization feature amount based on the periodicity information as described above, and therefore, it is possible to generate the sound synchronization feature amount in a robust manner.

<Explanation of Main Content Reproduction Processing>

If the main transmission signal is transmitted from the providing apparatus 11, the content reproduction system acquires the main transmission signal as a main received signal and reproduces the main content. Hereinafter, a description will be given of the main content reproduction processing by the content reproduction system with reference to the flowchart in FIG. 15.

In Step S71, the input unit 111 acquires the main received signal and supplies the main received signal to the reproduction processing unit 112. For example, the input unit 111 acquires the main received signal by receiving the main received signal transmitted from the providing apparatus 11.

In Step S72, the reproduction processing unit 112 reproduces the main content based on the main received signal supplied from the input unit 111 and completes the main content reproduction processing.

For example, the reproduction processing unit 112 extracts an image signal and a sound signal of the main content from the main received signal, supplies the image signal to the display unit 82, causes the display unit 82 to reproduce the image signal, supplies the sound signal to the speaker 83, and causes the speaker 83 to reproduce the sound signal. With such a configuration, the main content is reproduced.

As described above, the content reproduction system acquires the main received signal and reproduces the main content.

<Explanation of Sub Content Reproduction Processing>

In addition, the content reproduction system acquires the sub received signal and reproduces the sub content in synchronization with the reproduction of the main content. Hereinafter, a description will be given of the sub content reproduction processing by the content reproduction system with reference to the flowchart in FIG. 16.

In Step S101, the input unit 123 acquires the sub received signal and supplies the sub received signal to the separation processing unit 124. For example, the input unit 123 acquires the sub received signal by receiving the sub transmission signal transmitted from the providing apparatus 11 as the sub received signal.

In Step S102, the separation processing unit 124 separates the sub received signal supplied from the input unit 123 into a sub channel signal and a sound synchronization feature amount, supplies the separated sub channel signal and the sound synchronization feature amount to the buffer 125, and causes the buffer 125 to record the sub channel signal and the sound synchronization feature amount.

Figure 15:
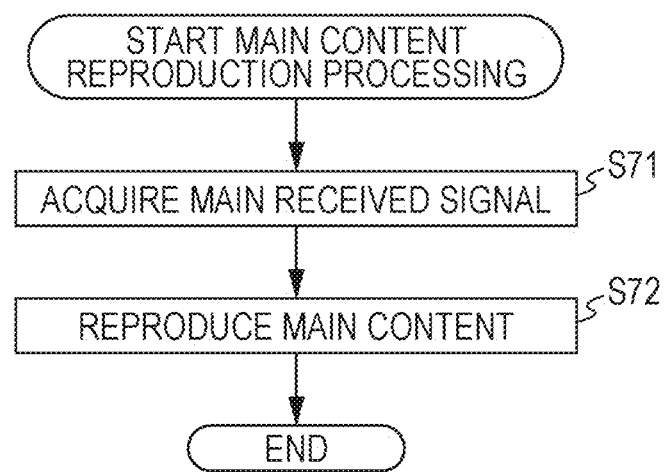
FIG. 15 is a flowchart illustrating main content reproduction processing.

In Step S103, the microphone 84 collects sound of the main content output from the speaker 83 and supplies the sound signal acquired as a result to the sound synchronization feature amount calculation unit 121. In Step S103, the sound of the main content reproduced by the processing in Step S72 in FIG. 15 is collected, for example.

In Step S104, the sound synchronization feature amount calculation unit 121 performs the sound synchronization feature amount calculation processing to calculate the sound synchronization feature amount from the sound signal supplied from the microphone 84, supplies the sound synchronization feature amount to the buffer 122, and causes the buffer 122 to record the sound synchronization feature amount.

Figure 14:
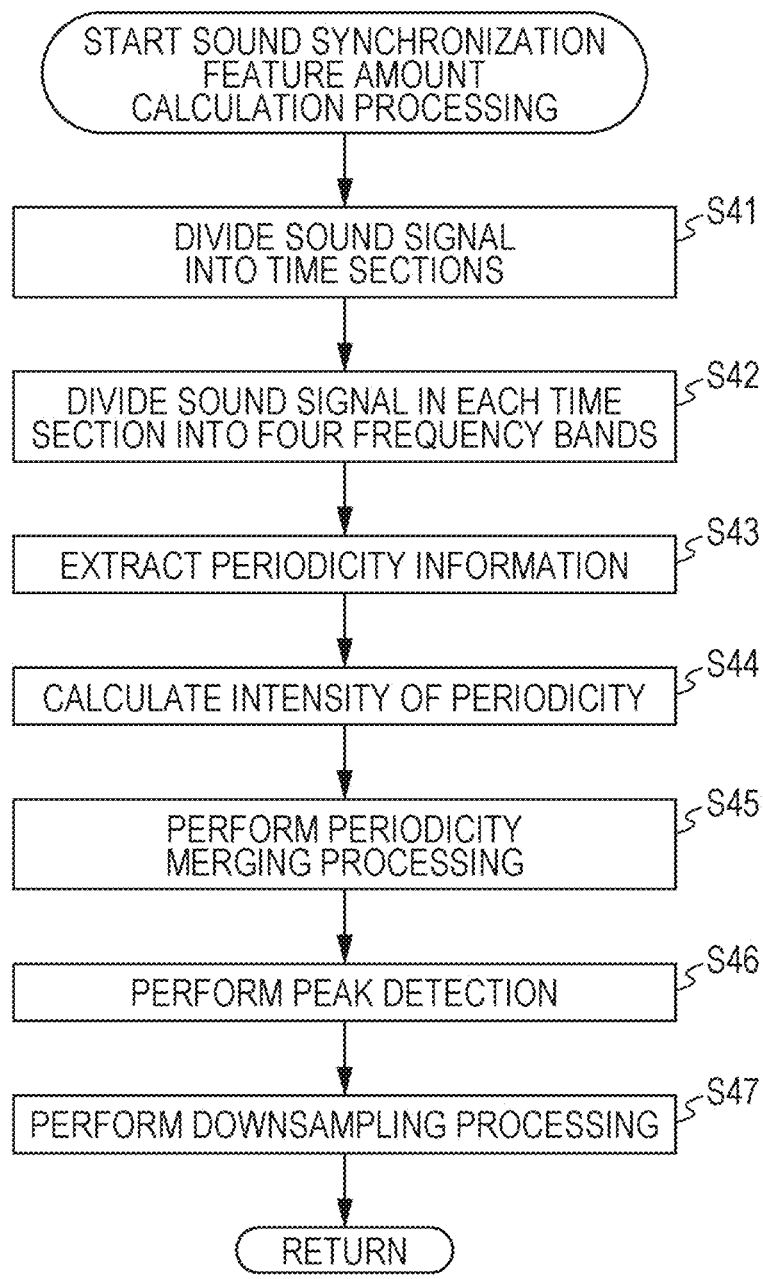
FIG. 14 is a flowchart illustrating sound synchronization feature amount calculation processing.
Figure 17:
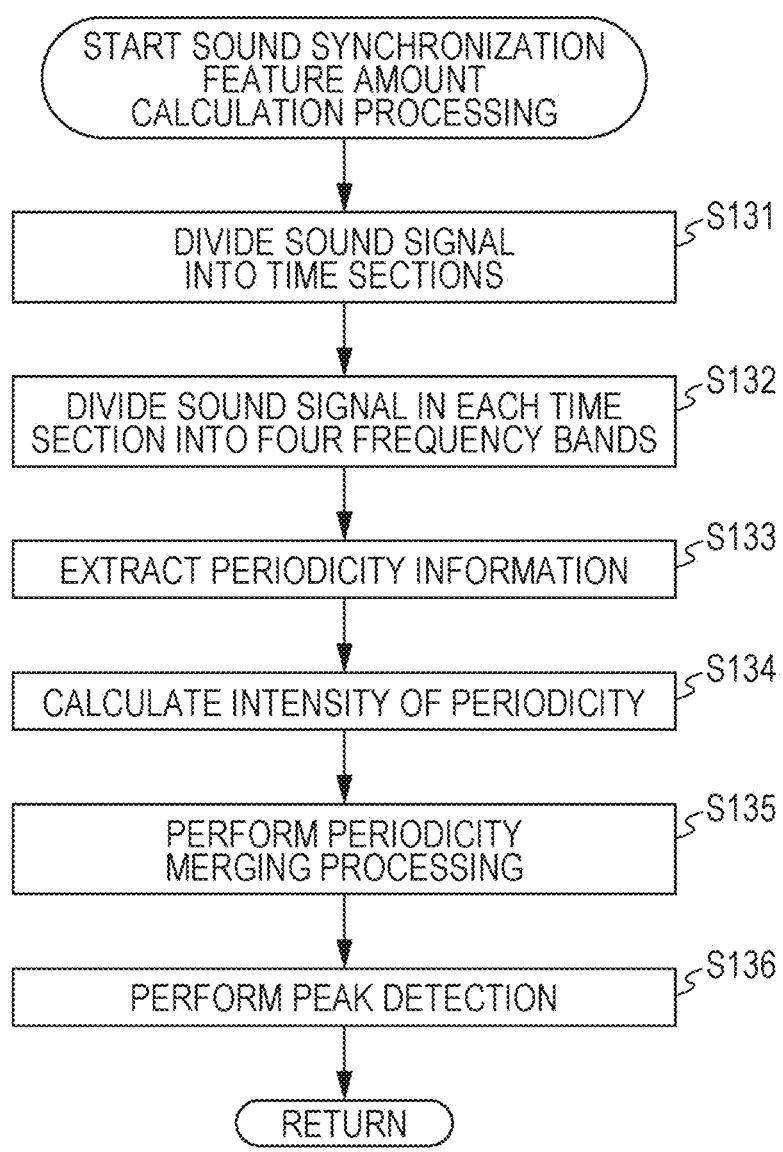
FIG. 17 is a flowchart illustrating the sound synchronization feature amount calculation processing.

Although processing in Steps S131 to S136 shown in the flowchart in FIG. 17 is performed as the sound synchronization feature amount calculation processing, the processing are the same as the processing in Steps S41 to S46 in FIG. 14, and therefore, the description thereof will be omitted. However, in the sound synchronization feature amount calculation processing shown in FIG. 17, the sound synchronization feature amount is calculated from the sound signal supplied from the microphone 84 and is accumulated in the buffer 122. In addition, the sound synchronization feature amount calculation unit 121 regards the peak information acquired by the peak detection unit 155 as the sound synchronization feature amount.

Figure 16:
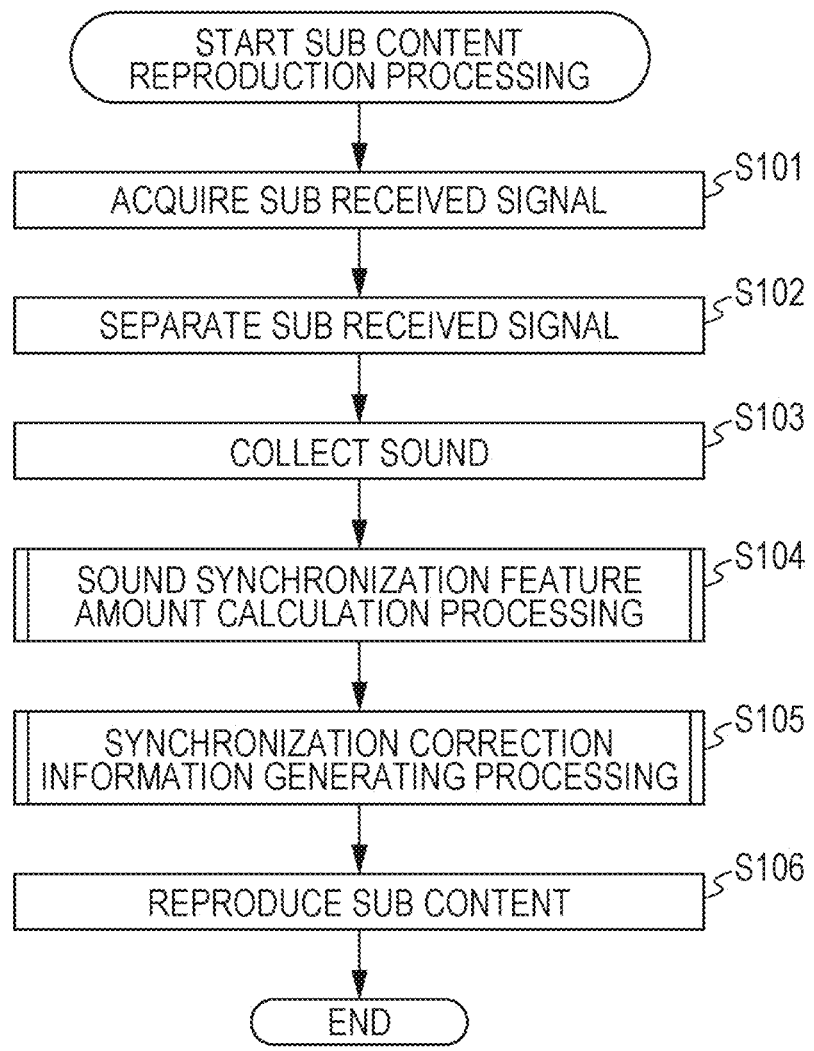
FIG. 16 is a flowchart illustrating sub content production processing.

Returning to the explanation of the flowchart in FIG. 16, the synchronization calculation unit 126 performs the synchronization correction information generating processing to generate synchronization correction information based on a sound feature amount, and supplies the synchronization correction information to the reproduction processing unit 127 in Step S105. Although a detailed description of the synchronization correction information generating processing is described later, the synchronization correction information based on the sound feature amount for synchronizing the main content with the sub content is generated by comparing the sound synchronization feature amount recorded in the buffer 122 and the sound synchronization feature amount recorded in the buffer 125 in this processing.

In Step S106, the reproduction processing unit 127 corrects a reproduction timing of the sub channel signal recorded in the buffer 125 in accordance with the synchronization correction information based on the sound feature amount, which is supplied from the synchronization calculation unit 126, and reproduces the sub content based on the sub channel signal after the correction.

That is, the reproduction processing unit 127 supplies the image signal and the sound signal, which configure the sub channel signal, to the display unit 86 and the speaker 87 earlier or with a delay by the time indicated by the synchronization correction information based on the sound feature amount and causes the display unit 86 and the speaker 87 to reproduce the image signal and the sound signal. In other words, a part of the sub content at a reproduction time corresponding to that of a part of the main content being reproduced at the current time, which is specified by the synchronization correction information based on the sound feature amount, is reproduced.

For example, adjustment (correction) of a reproduction position for synchronizing the sub content with the main content is performed in no-sound sections in the sub content and the main content.

The display unit 86 displays an image of the sub content based on the image signal supplied from the reproduction processing unit 127, and the speaker 87 outputs sound of the sub content based on the sound signal supplied from the reproduction processing unit 127.

If the sub content is reproduced in synchronization with the main content as described above, the sub content reproduction processing is completed.

As described above, the content reproduction system calculates the sound synchronization feature amount from the sound signal acquired by collecting the sound of the main content being reproduced, and calculates the synchronization correction information based on the sound feature amount by using the acquired sound synchronization feature amount and the sound synchronization feature amount included in the sub received signal. In addition, the content reproduction system reproduces the sub content in synchronization with the main content by using the obtained synchronization correction information.

By calculating the synchronization correction information based on the sound feature amount by using the sound synchronization feature amount extracted from the sound signal which is acquired through sound collection and the sound synchronization feature amount included in the sub received signal as described above, it is possible to reproduce the main content and the sub content in a synchronized manner even in a case where transmission paths of the main content and the sub content are different.

Although the synchronous calculation of the sound synchronization feature amounts, namely the matching processing is performed for each frame in this example, the synchronous calculation of the sound synchronization feature amounts is not necessarily performed in a temporally continuous manner and may be performed intermittently. However, it is possible to correct the reproduction time (reproduction position) of the sub content without uncomfortable feeling when the synchronous calculation is continuously performed.

<Explanation of Synchronization Correction Information Generating Processing>

Furthermore, a description will be given of the synchronization correction information generating processing corresponding to the processing in Step S105 in FIG. 16 with reference to the flowchart in FIG. 18.

In Step S161, the frame rate conversion unit 181 and the frame rate conversion unit 182 perform frame rate conversion processing as necessary.

That is, the frame rate conversion unit 181 reads the time-series data of the sound synchronization feature amount for each time section in the main content from the buffer 122, performs the frame rate conversion, namely the downsampling on the sound synchronization feature amount as necessary, and supplies the sound synchronization feature amount to the block merging unit 183. In addition, the frame rate conversion unit 182 reads the time-series data of the sound synchronization feature amount for each time section in the main content from the buffer 125, performs the frame rate conversion, namely the downsampling or the upsampling on the sound synchronization feature amount as necessary, and supplies the sound synchronization feature amount to the block merging unit 184.

In Step S162, the block merging unit 183 and the block merging unit 184 merge the time-series data of the sound synchronization feature amounts.

Specifically, the block merging unit 183 receives the supply of the time-series data of the sound synchronization feature amount for each time section in the main content from the frame rate conversion unit 181. Then, the block merging unit 183 regards a plurality of (sixty-four, for example) continuous time sections as one block, merges the supplied time-series data of the sound synchronization feature amount for each time section in units of blocks, and supplies the time-series data to the similarity calculation unit 185.

In addition, the block merging unit 184 receives the supply of the time-series data of the sound synchronization feature amount for each time section in the main content from the frame rate conversion unit 182. Then, the block merging unit 184 regards a plurality of (sixty-four, for example) continuous time sections as one block, merges the supplied time-series data of the sound synchronization feature amount for each time section in units of blocks, and supplies the time-series data to the similarity calculation unit 185.

In Step S163, the similarity calculation unit 185 calculates similarity between time-series data items of the sound synchronization feature amounts in units of blocks, which are supplied from the block merging unit 183 and the block merging unit 184, and generates a similarity matrix representing similarity between the respective blocks. The similarity calculation unit 185 supplies the similarity matrix to the optimal path search unit 186.

In Step S164, the optimal path search unit 186 searches for a path with optimal similarity from the similarity matrix supplied from the similarity calculation unit 185 and generates the synchronization correction information based on the sound feature amount. Then, the optimal path search unit 186 supplies the synchronization correction information based on the sound feature amount to the reproduction processing unit 127 and completes the synchronization correction information generation processing.

As described above, the content reproduction system generates the synchronization correction information based on the sound feature amount in accordance with the periodicity information, and therefore, the content reproduction system can generate the synchronization correction information in a robust manner.

Although the above description was given of a case where the number of pieces of main content is one, the number of pieces of main content may be two or more.

In such a case, the sound synchronization feature amount calculation unit 23 in the providing apparatus 11 calculates the sound synchronization feature amount for each of the plurality of pieces of main content, and the multiplexing processing unit 24 multiplexes a sub channel signal of a piece of sub content and sound synchronization feature amounts of the plurality of pieces of main content, and acquires a sub transmission signal. In addition, the output unit 22 transmits main transmission signals acquired from main channel signals of the plurality of pieces of main content.

Furthermore, the reproduction processing unit 112 in the content reproduction system shown in FIG. 4 selects and reproduces one of the plurality of pieces of main content in this case. In addition, the input unit 123 receives the sub received signal, in which the sound synchronization feature amounts of the plurality of pieces of main content are associated with the single sub channel signal.

In addition, the synchronization calculation unit 126 calculates similarity by comparing a sound synchronization feature amount in each piece of the main content, which is acquired by the input unit 123, with a sound synchronization feature amount acquired by the sound synchronization feature amount calculation unit 121 and specifies main content being reproduced by the speaker 83. For example, main content with a sound synchronization feature amount which has the highest similarity as a result of the matching with the sound synchronization feature amount is regarded as main content being reproduced.

If the main content being reproduced is specified, a reproduction position of the sub content is corrected based on synchronization correction information acquired based on the sound synchronization feature amount of the specified main content. That is, the synchronization calculation unit 126 generates synchronization correction information based on the sound feature amount for synchronizing the specified main content with the sub content.

<Application Example 1 of the Present Technology>

The present technology as described hitherto can be applied to various systems.

Figure 19:
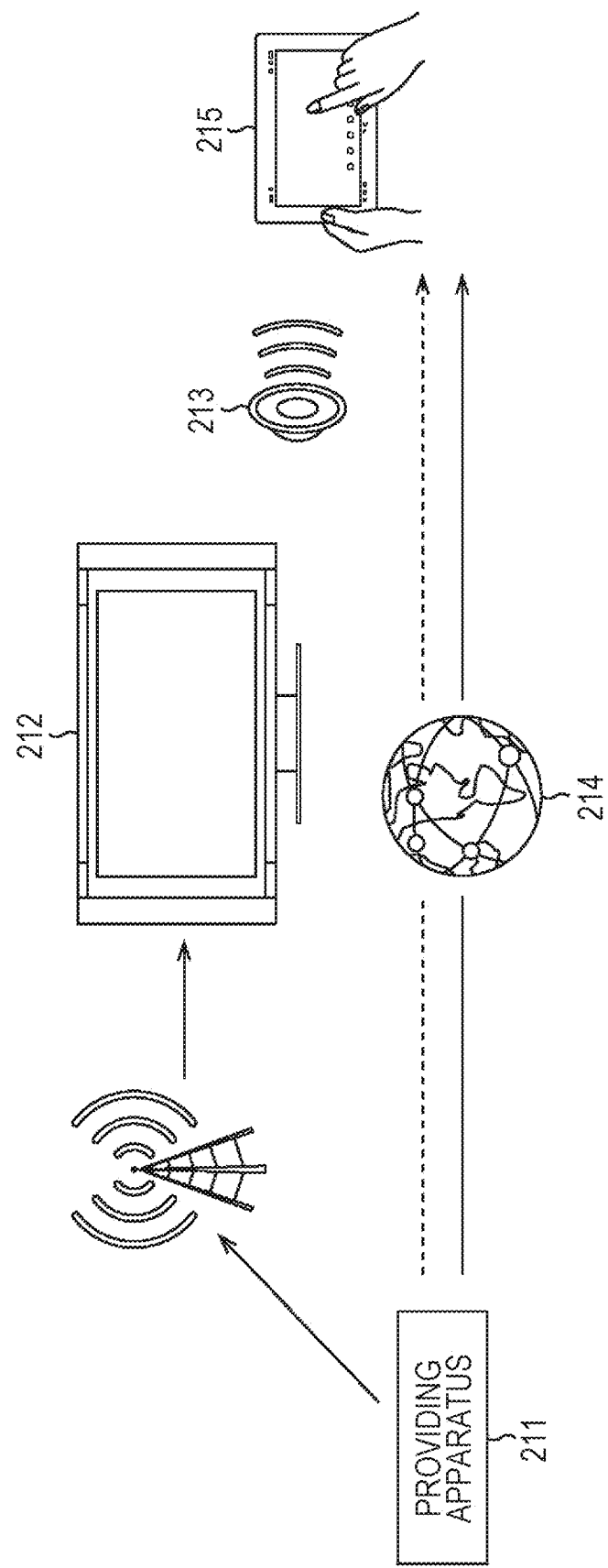
FIG. 19 is a diagram showing an application example of the present technology.

For example, the present technology can be applied to a system shown in FIG. 19.

In the system shown in FIG. 19, for example, a providing apparatus 211 such as a broadcasting station corresponds to the providing apparatus 11 in FIG. 1. The providing apparatus 211 provides main content and sub content.

In this example, the providing apparatus 211 transmits a main transmission signal to a main receiving device 212 by broadcasting the main transmission signal of the main content by a broadcasting wave, for example. Then, the main receiving device 212 receives the main transmission signal transmitted by the broadcasting wave as a main received signal and reproduces the main content. At this time, the main receiving device 212 outputs sound of the main content from the speaker 213 provided in the main receiving device 212.

Accordingly, the main receiving device 212 is configured of the main receiving device 81, the display unit 82, and the speaker 83 shown in FIG. 4 in this example. In such a case, the input unit 111 receives the main received signal broadcasted by the broadcasting wave. In addition, a speaker 213 corresponds to the speaker 83 in FIG. 4.

For example, the main receiving device 212 is a television receiver or the like, and a user views and hears the main content reproduced by the main receiving device 212.

In contrast, the providing apparatus 211 also transmits a sub transmission signal. In this example, the providing apparatus 211 transmits the sub transmission signal to a sub receiving device 215 by streaming distribution or the like via a communication network 214 including the Internet. Here, the sub transmission signal is transmitted by a so-called push-type communication.

In addition, the sub receiving device 215 is configured of a tablet terminal device, for example, receives the sub transmission signal transmitted through the communication network 214 as a sub received signal, and reproduces the sub content. That is, the sub receiving device 215 causes a built-in display unit to display an image of the sub content and causes a built-in speaker to output sounds of the sub content.

At this time, the sub receiving device 215 calculates a sound synchronization feature amount by collecting the sound of the main content output from the speaker 213, and generates synchronization correction information based on a sound feature amount by using the acquired sound synchronization feature amount and the sound synchronization feature amount included in the sub received signal. Then, the sub receiving device 215 reproduces the sub content in synchronization with the main content by using the synchronization correction information based on the sound feature amount.

With such a configuration, the main content reproduced by the main receiving device 212 and the sub content reproduced by the sub receiving device 215 are reproduced in the synchronized state, and the user can view and hear the main content while appropriately viewing and hearing the sub content. That is, the user can enjoy the main content while utilizing the sub content as supplementary information of the main content, for example.

In this example, the sub channel signal of the sub content is an image signal for a video from in a different angle from that of a video of the main content, a sound signal for commentary sound with respect to the main content, character information in relation to the main content, or the like.

In such a case, the sub receiving device 215 is configured of the microphone 84, the sub receiving device 85, the display unit 86, and the speaker 87 shown in FIG. 4, for example. Accordingly, the input unit 123 receives the sub transmission signal transmitted via the communication network 214 as a sub received signal.

In the example of FIG. 19, it is possible to simply and accurately reproduce the main content and the sub content, which are transmitted via mutually different transmission paths, in the synchronized manner by the push-type communication on the receiving side as described above. In this example, it is necessary to transmit the sub transmission signal prior to the main transmission signal. That is, it is necessary to transmit the main transmission signal and the sub transmission signal with a time difference determined in consideration of a difference between arrival time of the main transmission signal to the main receiving device 212 and arrival time of the sub transmission signal to the sub receiving device 215.

<Application Example 2 of Present Technology>

Figure 20:
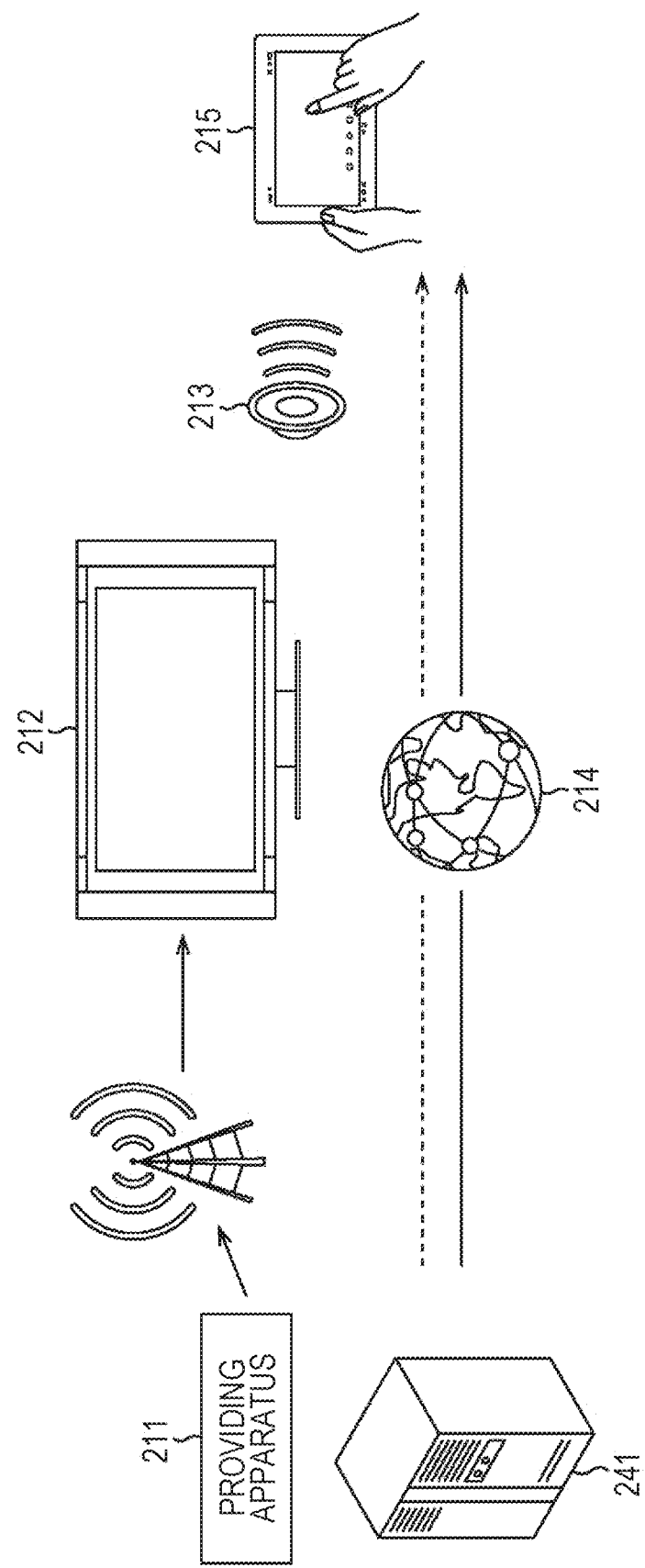
FIG. 20 is a diagram showing an application example of the present technology.

In addition, the present technology can be applied to a system shown in FIG. 20, for example. In FIG. 20, the same reference numerals are given to parts corresponding to those in FIG. 19, and the descriptions thereof will be omitted.

In the example of FIG. 20, a main transmission signal is transmitted to the main receiving device 212 by a broadcasting wave, namely via the push-type communication from the providing apparatus 211 in the same manner as in the example of FIG. 19.

In contrast, the sub transmission signal is transmitted to the sub receiving device 215 from a server 241 via the communication network 214. In addition, the server 241 acquires the sub transmission signal in advance from the providing apparatus 211 or the like by a certain method and records the sub transmission signal therein.

In this example, the sub transmission signal is transmitted via so-called pull-type communication. Accordingly, the server 241 transmits the sub transmission signal to the sub receiving device 215 via the communication network 214 when the sub receiving device 215 requests transmission of the sub transmission signal.

That is, the input unit 123 in the sub receiving device 85 in FIG. 4 corresponding to the sub receiving device 215 transmits a request for the transmission of the sub transmission signal to the server 241 and receives as a sub received signal the sub transmission signal transmitted from the server 241 in response to the transmission request.

In such a case, the sub receiving device 215 can receive and record the sub transmission signal in advance prior to the broadcasting of the main content. Accordingly, if the sub transmission signal is received and recorded in advance, it is possible to prevent a situation where it is not possible to reproduce the sub content in synchronization with the main content due to a condition of the communication network 214 or the like when the main content is broadcasted.

If the reproduction of the main content is started by the main receiving device 212, the sub receiving device 215 collects sound of the main content output from the speaker 213, and calculates the sound synchronization feature amount. Then, the sub receiving device 215 generates synchronization correction information based on a sound feature amount by using the acquired sound synchronization feature amount and the sound synchronization feature amount included in the sub received signal, and reproduces the sub content in synchronization with the main content by using the synchronization correction information.

In the example of FIG. 20, the sub receiving device 215 can acquire the sub received signal at a timing which is convenient for the sub receiving device 215 itself.

<Application Example 3 of Present Technology>

Figure 21:
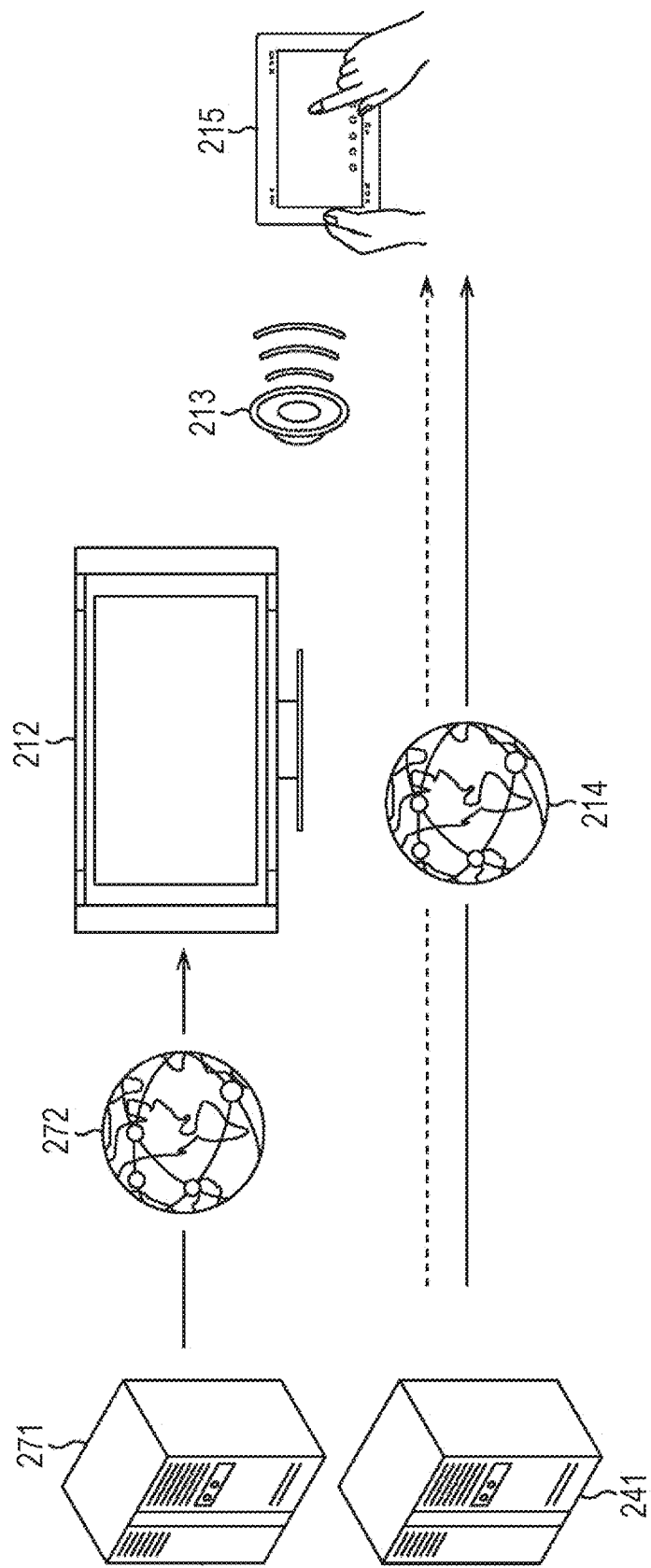
FIG. 21 is a diagram showing an application example of the present technology.

In addition, the present technology can be applied to a system shown in FIG. 21, for example. In FIG. 21, the same reference numerals are given to parts corresponding to those in FIG. 20, and the descriptions thereof will be omitted.

In the example of FIG. 21, main content, namely a main transmission signal is provided by a server 271 which is different from the server 241. That is, the server 271 transmits the recorded main transmission signal to the main receiving device 212 via a communication network 272 in response to a request from the main receiving device 212. That is, the main transmission signal is transmitted by the pull-type communication in this example.

Specifically, the input unit 111 in the main receiving device 81 in FIG. 4 corresponding to the main receiving device 212 transmits a transmission request of the main transmission signal to the server 271, and receives as the main received signal the main transmission signal transmitted from the server 271 in response to the transmission request.

In such a case, the main receiving device 212 can receive and record the main transmission signal in advance. Accordingly, if the main transmission signal is received and recorded in advance, it is possible to prevent a situation where the reproduction of the main content pauses or stops due to a condition of the communication network 272 or the like when the main content is reproduced.

In addition, the sub transmission signal is transmitted by the server 241 via the pull-type communication in the same manner as in the example of FIG. 20.

If the reproduction of the main content by the main receiving device 212 is started, the sub receiving device 215 collects sound of the main content output from the speaker 213 and calculates a sound synchronization feature amount. Then, the sub receiving device 215 generates synchronization correction information based on a sound feature amount by using the acquired sound synchronization feature amount and the sound synchronization feature amount included in the sub received signal, and reproduces the sub content in synchronization with the main content by using the synchronization correction information.

In the example of FIG. 21, the main receiving device 212 and the sub receiving device 215 can acquire the main received signal and the sub received signal at timings which are convenient for the main receiving device 212 and the sub receiving device 215 themselves.

Even when the communication network 272 is the same as the communication network 214, transmission paths of the main transmission signal and the sub transmission signal typically differ from each other if transmission timings, receiving devices, and the like of the main transmission signal and the sub transmission signal are different from each other.

Second Embodiment

<Features of Present Technology>

Incidentally, an application program according to which a plurality of pieces of media content with a time-synchronized relationship are received by a plurality of devices through broadcasting, an Internet Protocol (IP) network, or the like and the received media content is reproduced in a synchronized manner as in the aforementioned examples (A1) to (A4) can be assumed.

In order to implement such functionality, a system for a broadcasting communication cooperative service has been studied and developed in which content is distributed by broadcasting while additional content is individually distributed via the IP network such as by hybrid cast and a content receiver simultaneously outputs the content distributed by the broadcasting and the additional content distributed via the IP network in a temporally synchronized manner.

For example, Hybridcast is described in "Kinji Matsumura, Yoshiaki Shishikui, and Michael J. Evans, "Personalization System of Broadcast Content using Synchronized Internet Streaming" in Proceedings of the Institute of Image Information and Television Engineers annual convention, Aug. 26, 2009, p.p. 3-8" (hereinafter, also referred to as NPL 1).

In addition, hybridcast is also described in "Japan Broadcasting Corporation, "Summary and Technology of Hybridcast™", Science and Technology Research Laboratories of Japan Broadcasting Corporation, R&D, No. 124, p.p. 10-17. November, 2010, NHK Publishing, Inc., http://www.nhk.or.jp/strl/publica/rd/rd124/PDF/P10-17.pdf" (hereinafter, also referred to as NPL 2), "Japan Broadcasting Corporation, "Technologies Supporting Hybridcast™", Science and Technology Research Laboratories of Japan Broadcasting Corporation, R&D, No. 133, p.p. 20-27. May, 2012, NHK Publishing, Inc., http://www.nhk.or.jp/strl/publica/rd/rd133/PDF/P20-27.pdf" (hereinafter, also referred to as NPL 3), and the like.

According to a basic principle of the Hybridcast, additional content to which presentation time information (presentation time stamp (PTS)) based on a reference clock of a broadcasting stream is added is streaming-distributed at the same time with or slightly prior to transmission of broadcasting content, a receiver is provided with a buffer with sufficient capacity for absorbing delay and variations in the communication content, and synchronization is established by making the broadcasting content delay and comparing the time stamps of both the broadcasting content and the additional content.

According to NPL 2, for example, it was confirmed that synchronization can be established with precision within about one video frame (33 ms) in an experimental environment in which both the receivers are in the same device.

A device which receives the additional content may be a device independent of a broadcasting content receiving device, such as a smart phone or a tablet personal computer connected in a wireless manner with the IP network. In such a case, it is necessary for the broadcasting content receiving device to provide the presentation time information (time stamp) to the device which receives the additional content. This operation is typically cooperated via the IP network.

In addition, it is possible to easily imagine implementation of a system which distributes a plurality of pieces of content only via a network such as the IP network instead of broadcasting, adds a time stamp by using coordinated universal time (UTC) as a reference clock, performs synchronization on the receiver side, and outputs the plurality of pieces of content.

When such a broadcasting communication cooperative service is utilized by an independent receiver in practice, it is difficult to precisely establish the synchronization by the method of comparing the time stamps for the following two reasons.

First, there is a difference in a system clock as long as the broadcasting content receiver and the additional content receiver are independent electronic devices, and deviations in synchronization occur over time.

Second, a use state where a user is positioned with a distance from the broadcasting content receiver such as a television receiver to some extent, holds the additional content receiver such as a smart phone or a tablet personal computer by their hand, and enjoys the additional content distributed via the IP network can be assumed. If sound signals are included in the broadcasting content and the additional content in this use state, it is difficult to establish precise synchronization at the position where the user views and hears the content.

When the user is away from the broadcasting content receiver by 10 m, for example, it takes 10 (m)/340 (m/s)= about 30 (ms) for the sound signal output from the broadcasting content receiver to reach the user position. Here, a sound velocity is about 340 (m/s).

The first embodiment employs the method of collecting sound output from the broadcasting content receiver by the additional content receiver, calculating a sound synchronization feature amount, and performing synchronous calculation with a sound synchronization feature amount of the broadcasting content distributed via the IP network. However, it is necessary to search for a synchronization position in a wide range, and the processing amount increases when transmission delay, fluctuation, or the like of the IP network is severe.

Thus, it is possible to synchronize a plurality of pieces of content acquired through different paths with much less processing amount, by providing the following features B11 to B20 for the aforementioned providing apparatus and the content reproduction system.

(Feature B11)

The media content is a data stream which is acquired by multiplexing a video, sound, an image, character information, and the like.

As for the transmission of the data stream of (Feature B11), transmission of the media content by a broadcasting wave or through a network including the Internet is assumed, and a logical transmission path occupied by the multiplexed data stream will be referred to as a transmission path.

(Feature B12)

The plurality of pieces of media content as transmission targets have a time-synchronized relationship.

(Feature B13)

At least one of the plurality of pieces of media content as transmission targets is determined to be a main channel signal, and the rest of the pieces of the media content is respectively regarded as a sub channel signal.

(Feature B14)

A presentation time information (PTC) is generated for each of the main channel signal and the sub channel signal from the reference time signal.

Here, a reference clock (PCR) of the broadcasting stream, a coordinated universal time (UTC), or the like is used as the reference time signal.

(Feature B15)

The presentation time information of the main channel signal is multiplexed with the main channel signal to generate a main transmission signal, and the main transmission signal is transmitted. In contrast, a sound synchronization feature amount is also calculated from the sound signal of the main channel signal.

(Feature B16)

The multiplexing processing of the presentation time information of the sub channel signal, the sound synchronization feature amount of the main channel signal, and the sub channel signal is performed in the transmission format defined by the system such that time-synchronized relationship between the main channel signal and the sub channel signal is satisfied, and a sub transmission signal is generated.

(Feature B17)

The main receiving device acquires and separates the main received signal, and outputs sound based on the sound signal by a speaker or the like when the main channel signal is reproduced. At the same time, the main receiving device presents the presentation time information of the received main channel signal such that the presentation time information can be referred to or acquired from the outside.

For example, the presentation time information of the main channel signal can be referred to from the outside via IP network connection by wireless communication by an application programming interface (API) of software providing an acquiring function thereof.

(Feature B18)

The sub receiving device acquires and separates the sub received signal, compares the presentation time information of the received sub channel signal with the presentation time information of the main channel signal acquired from the main receiving device and generates synchronization correction information based on the presentation time information.

(Feature B19)

The sub receiving device collects sound of the main channel signal, which is output by the main receiving device from the speaker, by a microphone or the like, calculates a sound synchronization feature amount, performs automatic synchronous calculation with respect to the sound synchronization feature amount of the received main channel signal in consideration of the synchronization correction information based on the presentation time information, which is generated in (Feature B18), and calculates synchronization correction information (time difference information) based on a sound feature amount.

Since it is possible to roughly identify a synchronization position from the synchronization correction information based on the presentation time information, which is acquired by the comparison of the presentation time information, the processing amount necessary for the automatic synchronous calculation processing based on the sound synchronization feature amount in a later stage decreases.
(Feature B20)

The sub receiving device performs synchronization correction processing on the received sub channel signal with respect to the main channel signal in accordance with the synchronization correction information based on the sound feature amount, and performs reproduction.

<Configuration Example of Providing Apparatus>

Next, a description will be given of specific embodiments of the providing apparatus with the aforementioned features B11 to B20 and the content reproduction system.

Figure 22:
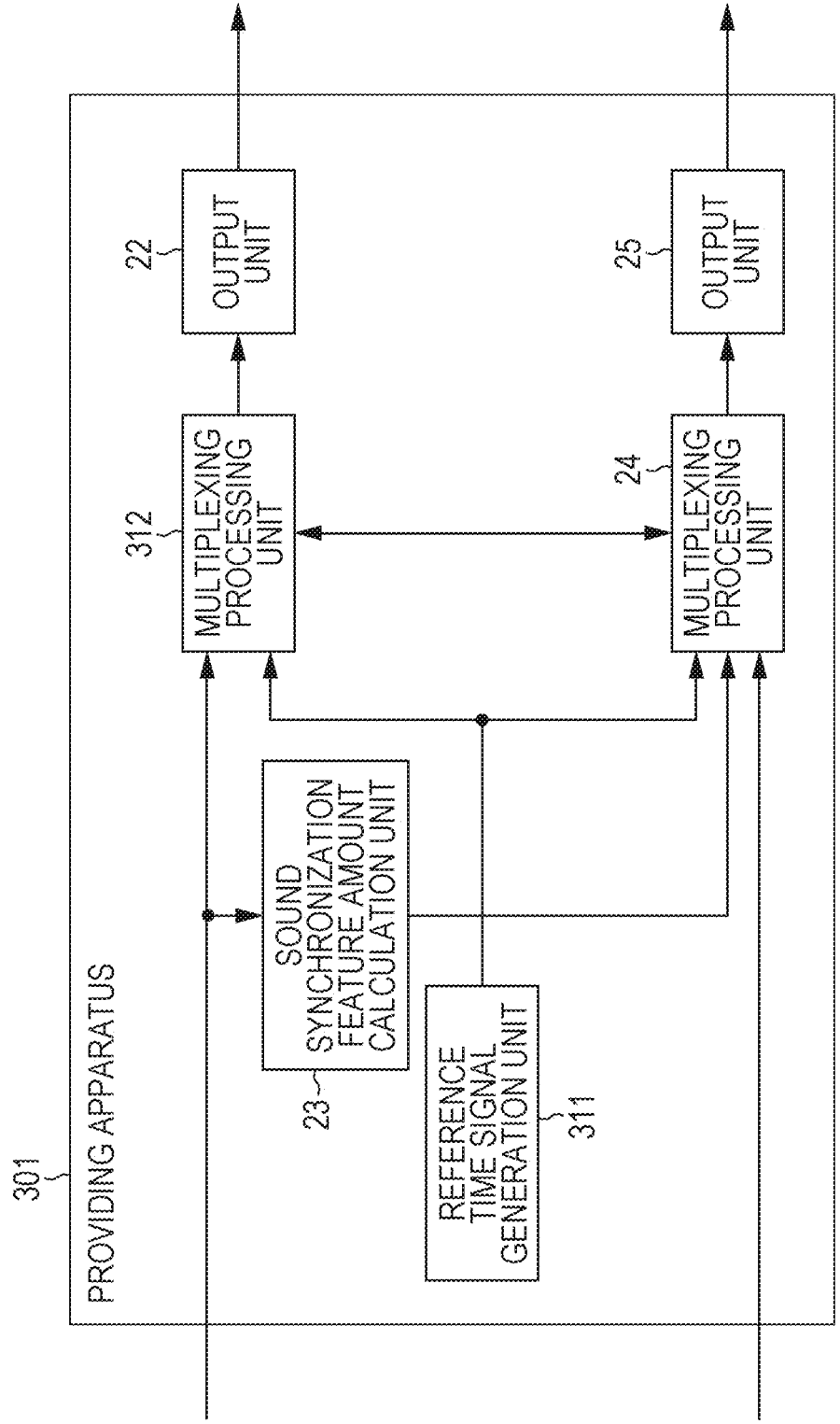
FIG. 22 is a diagram showing a configuration example of the providing apparatus.

FIG. 22 is a diagram showing a configuration example of the providing apparatus which provides content in a time-synchronized relationship as in the aforementioned examples (A1) to (A4). In FIG. 22, the same reference numerals are given to parts corresponding to those in FIG. 1, and the descriptions thereof will be appropriately omitted.

A providing apparatus 301 includes a reference time signal generation unit 311, a multiplexing processing unit 312, the output unit 22, the sound synchronization feature amount calculation unit 23, the multiplexing processing unit 24, and the output unit 25.

The configuration of the providing apparatus 301 is different from the configuration of the providing apparatus 11 in that the conversion unit 21 in the providing apparatus 11 is replaced with the multiplexing processing unit 312 and the reference time signal generation unit 311 is newly provided.

The reference time signal generation unit 311 generates presentation time information which indicates content presentation timing of the main channel signal and the sub channel signal based on the PCR and the UTC and supplies the presentation time information to the multiplexing processing unit 312 and the multiplexing processing unit 24. For example, the presentation time information is a PTS and is utilized for establishing synchronization between the main channel signal and the sub channel signal on the reproduction side.

The multiplexing processing unit 312 converts the supplied main channel signal into a signal in a format defined by a predetermined broadcasting standard or the like. In addition, the multiplexing processing unit 312 generates a main transmission signal by multiplexing the main channel signal in the converted format with the presentation time information supplied from the reference time signal generation unit 311, and supplies the main transmission signal to the output unit 22. The presentation time information included in the main transmission signal is presentation time information of the main channel signal.

In addition, the multiplexing processing unit 24 multiplexes the sound synchronization feature amount supplied from the sound synchronization feature amount calculation unit 23, the supplied sub channel signal, and the presentation time information supplied from the reference time signal generation unit 311 in a temporally synchronized state, then performs the format conversion as necessary, and generates a sub transmission signal. The multiplexing processing unit 24 supplies the acquired sub transmission signal to the output unit 25. The presentation time information included in the sub transmission signal is presentation time information of the sub channel signal.

In the same manner as in the providing apparatus 11, the multiplexing processing unit 24 may adjust the time-synchronized relationship of the sound synchronization feature amount, the sub channel signal, and the presentation time information by using the main channel signal.

<Configuration Example of Content Reproduction System>

Figure 23:
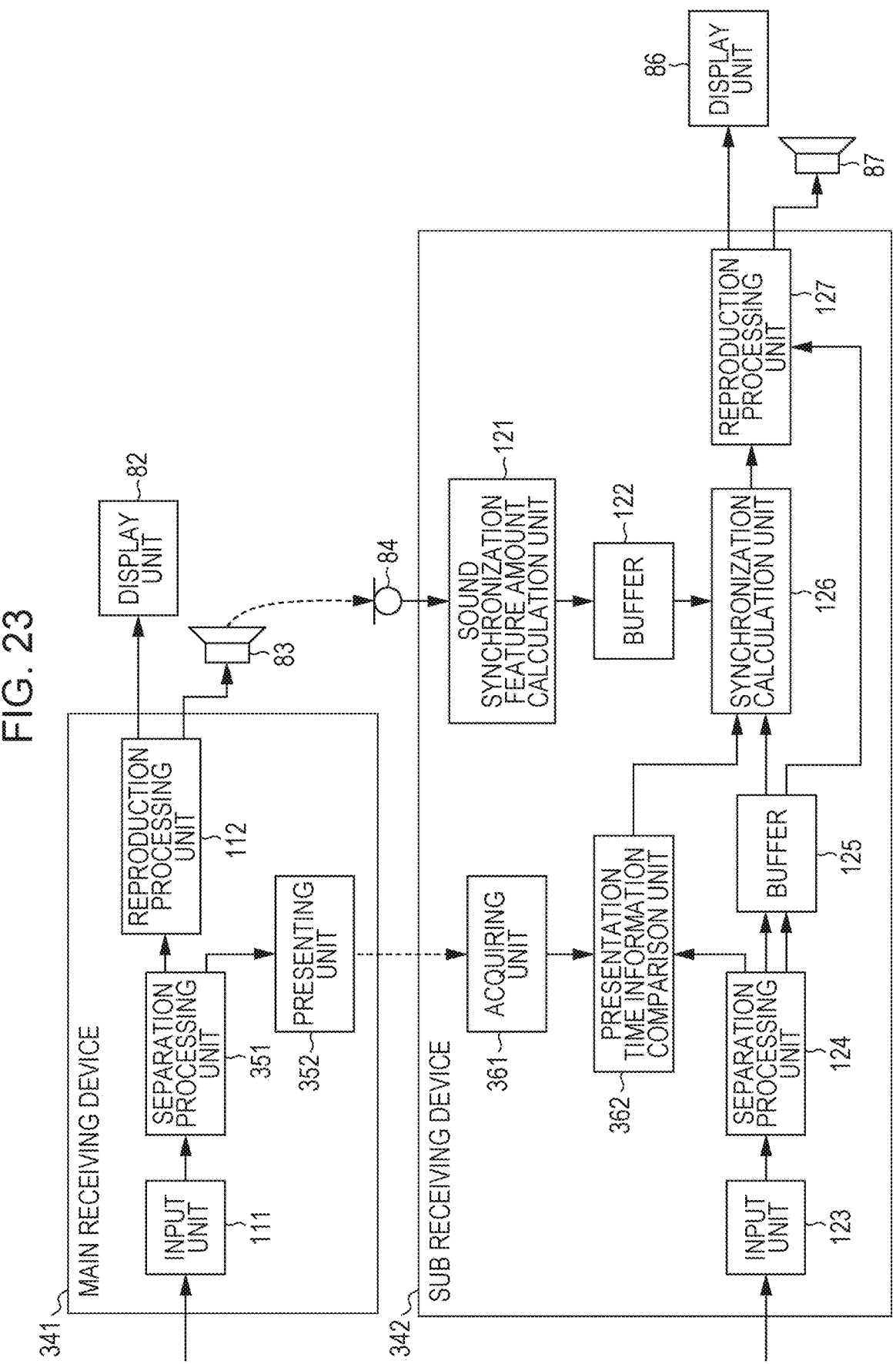
FIG. 23 is a diagram showing a configuration example of a content reproduction system.

In addition, the content reproduction system which receives the main transmission signal and the sub transmission signal transmitted from the providing apparatus 301 as the main received signal and the sub received signal and reproduces the main content and the sub content is configured as shown in FIG. 23, for example. In FIG. 23, the same reference numerals are given to parts corresponding to those in FIG. 4, and the descriptions thereof will be appropriately omitted.

The content reproduction system shown in FIG. 23 includes a main receiving device 341, the display unit 82, the speaker 83, the microphone 84, a sub receiving device 342, the display unit 86, and the speaker 87.

The main receiving device 341 receives the main received signal transmitted from the providing apparatus 301 and controls reproduction of the main content acquired from the main received signal.

The main receiving device 341 includes the input unit 111, a separation processing unit 351, a presenting unit 352, and the reproduction processing unit 112. The configuration of the main receiving device 341 is different from the configuration of the main receiving device 81 in that the separation processing unit 351 and the presenting unit 352 are newly provided.

The separation processing unit 351 separates the main received signal supplied from the input unit 111 into a main channel signal and presentation time information of the main channel signal, supplies the main channel signal to the reproduction processing unit 112, and supplies the presentation time information to the presenting unit 352.

The presenting unit 352 presents the presentation time information, which is supplied from the separation processing unit 351, to the sub receiving device 342 via a wired communication network or a wireless communication network including the Internet. That is, the presentation time information is transmitted in response to a request from a communication counterpart.

In addition, the sub receiving device 342 receives the sub transmission signal, which is transmitted from the providing apparatus 301, as a sub received signal and controls reproduction of sub content acquired from the sub received signal.

The sub receiving device 342 includes an acquiring unit 361, a presentation time information comparison unit 362, the sound synchronization feature amount calculation unit 121, the buffer 122, the input unit 123, the separation processing unit 124, the buffer 125, the synchronization calculation unit 126, and the reproduction processing unit 127.

The configuration of the sub receiving device 342 is different from the configuration of the sub receiving device 85 in that the acquiring unit 361 and the presentation time information comparison unit 362 are newly provided.

The acquisition unit 361 acquires the presentation time information, which is presented by the presenting unit 352, by using API or the like via a wired or wireless communication network and supplies the presentation time information to the presentation time information comparison unit 362. That is, the acquiring unit 361 receives the presentation time information transmitted from the presenting unit 352.

The separation processing unit 124 separates the sub received signal supplied from the input unit 123 into the sound synchronization feature amount, the sub channel, and the presentation time information, supplies the presentation time information to the presentation time information comparison unit 362, and supplies the sound synchronization feature amount and the sub channel signal to the buffer 125.

The presentation time information comparison unit 362 compares the presentation time information supplied form the separation processing unit 124 with the presentation time information supplied from the acquiring unit 361, generates synchronization correction information based on the presentation time information for synchronizing the main channel signal with the sub channel signal, and supplies the synchronization correction information to the synchronization calculation unit 126.

The synchronization correction information based on the presentation time information can correct a deviation between the main channel signal and the sub channel signal and establish synchronization therebetween by itself. However, the synchronization correction information based on the presentation time information is used by the synchronization calculation unit 126 to determine a range of the sound synchronization feature amounts to be read from the buffer 125 in order to more precisely synchronize the signals in this example. In other words, the synchronization correction information based on the presentation time information is utilized for roughly synchronizing the sound synchronization feature amount recorded in the buffer 125 with the sound synchronization feature amount recorded in the buffer 122. By using the synchronization correction information based on the presentation time information as described above, it is possible to perform the matching processing of the sound synchronization feature amounts with a less processing amount.

<Explanation of Transmission Processing>

Next, a description will be given of specific operations of the providing apparatus 301 and the content reproduction system described above.

Figure 24:
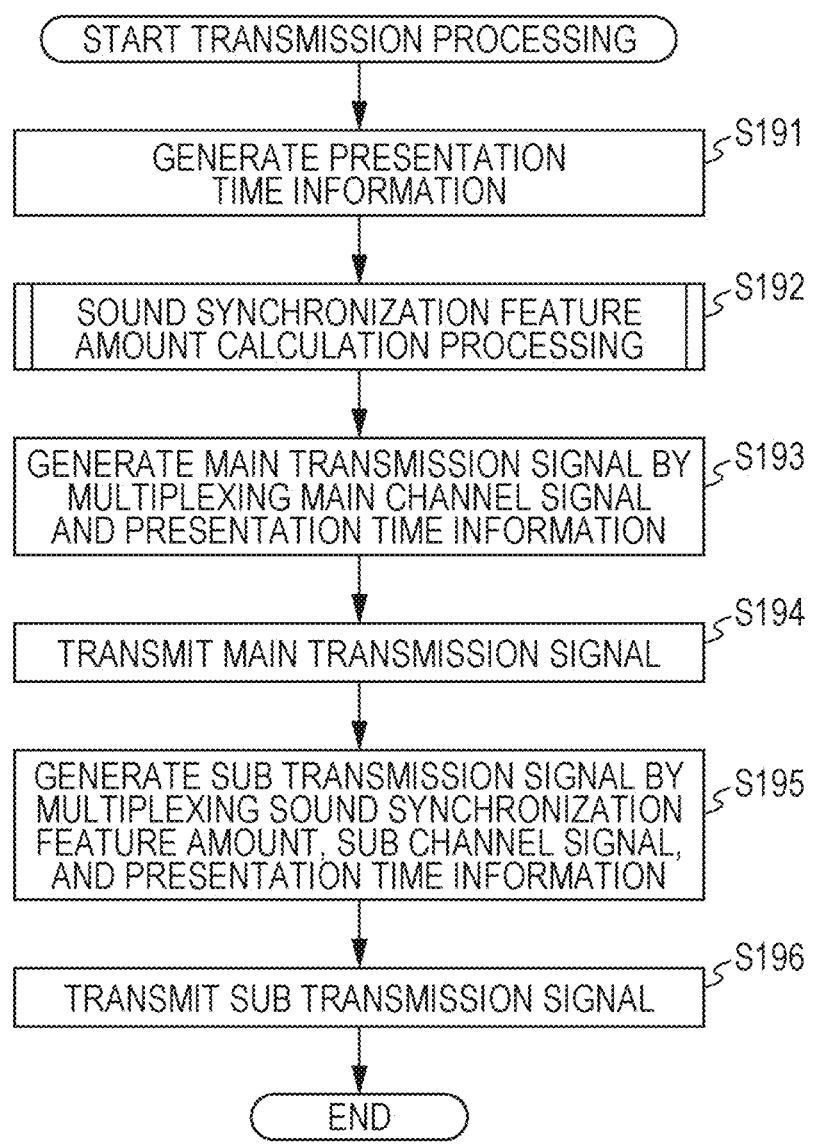
FIG. 24 is a flowchart illustrating transmission processing.

First, a description will be given of the transmission processing performed by the providing apparatus 301 with reference to the flowchart in FIG. 24.

In Step S191, the reference time signal generation unit 311 generates presentation time information of the main channel signal and the sub channel signal and supplies the presentation time information to the multiplexing processing unit 312 and the multiplexing processing unit 24.

In Step S192, the sound synchronization feature amount calculation unit 23 performs the sound synchronization feature amount calculation processing to calculate a sound synchronization feature amount from a sound signal configuring the supplied main channel signal, and supplies the sound synchronization feature amount to the multiplexing processing unit 24. In addition, since the sound synchronization feature amount calculation processing performed in Step S192 is the same as the sound synchronization feature amount calculation processing described with reference to FIG. 14, the description thereof will be omitted.

In Step S193, the multiplexing processing unit 312 generates a main transmission signal by multiplexing the supplied main channel signal with the presentation time information supplied from the reference time signal generation unit 311 and supplies the main transmission signal to the output unit 22. At this time, the multiplexing processing unit 312 performs the format conversion on the main channel signal as necessary.

In Step S194, the output unit 22 transmits the main transmission signal supplied from the multiplexing processing unit 312.

In Step S195, the multiplexing processing unit 24 generates a sub transmission signal by multiplexing the sound synchronization feature amount, the sub channel signal, and the presentation time information and supplies the sub transmission signal to the output unit 25.

That is, the multiplexing processing unit 24 multiplexes the sound synchronization feature amount from the sound synchronization feature amount calculation unit 23, the supplied sub channel signal, and the presentation time information supplied from the reference time signal generation unit 311 to acquire the sub transmission signal.

In Step S196, the output unit 25 transmits the sub transmission signal supplied from the multiplexing processing unit 24 and completes the transmission processing.

As described above, the providing apparatus 301 generates the presentation time information commonly used for the main channel signal and the sub channel signal, and generates the main transmission signal and the sub transmission signal including the presentation time information.

With such a configuration, it is possible to synchronize the main content and the sub content with a less processing amount by utilizing the presentation time information on the content reproduction side.

<Explanation of Main Content Reproduction Processing>

Figure 25:
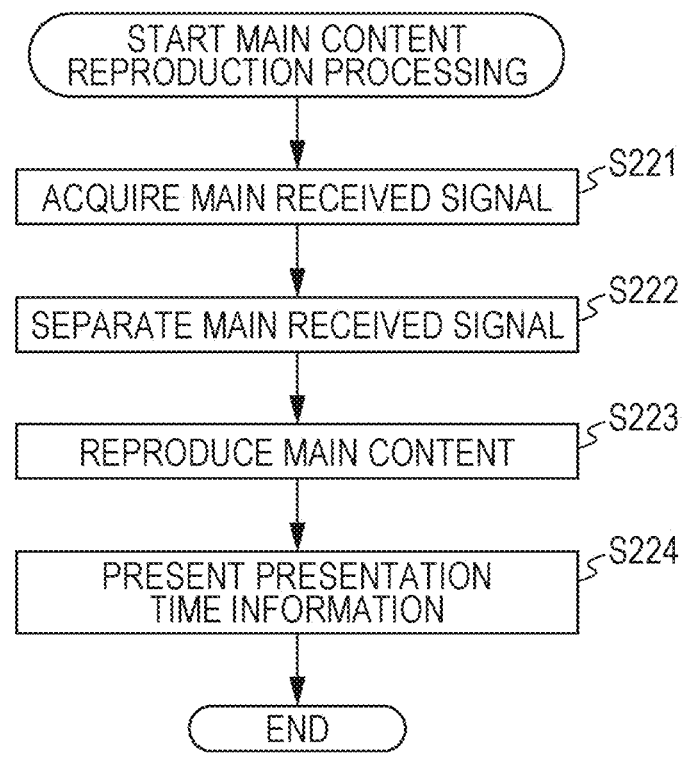
FIG. 25 is a flowchart illustrating the main content reproduction processing.

If the main transmission signal is transmitted from the providing apparatus 301, the content reproduction system acquires the main transmission signal as a main received signal and reproduces main content. Hereinafter, a description will be given of the main content reproduction processing by the content reproduction system with reference to the flowchart in FIG. 25.

In Step S221, the input unit 111 acquires the main received signal and supplies the main received signal to the separation processing unit 351. For example, the input unit 111 acquires the main received signal by receiving the main received signal transmitted from the providing apparatus 301.

In Step S222, the separation processing unit 351 separates the main received signal supplied from the input unit 111 into a main channel signal and presentation time information. The separation processing unit 351 supplies the main channel signal after the separation to the reproduction processing unit 112 and supplies the presentation time information to the presenting unit 352.

In Step S223, the reproduction processing unit 112 reproduces the main content based on the main channel signal supplied from the separation processing unit 351. In Step S223, the same processing as that in Step S72 in FIG. 15 is performed.

In Step S224, the presenting unit 352 presents the presentation time information supplied from the separation processing unit 351 and completes the main content reproduction processing. For example, the presentation time information is transmitted to the sub receiving device 342 in a wireless manner in a state of being synchronized with the reproduction of the main content.

As described above, the content reproduction system acquires the main received signal, reproduces the main content, and presents the presentation time information of the main content, namely the main channel signal.

By presenting the presentation time information of the main content at the same time with the reproduction of the main content as described above, the sub receiving device 342 which acquires the presentation time information can perform the synchronous calculation by using the sound synchronization feature amount with a less processing amount.

<Explanation of Sub Content Reproduction Processing>

In synchronization with the reproduction of the main content, the content reproduction system acquires a sub received signal and reproduces sub content. Hereinafter, a description will be given of the sub content reproduction processing by the content reproduction system with reference to the flowchart in FIG. 26.

Since the processing in Step S251 is the same as that in Step S101 in FIG. 16, the description thereof will be omitted.

In Step S252, the separation processing unit 124 separates the sub received signal supplied from the input unit 123 into a sub channel signal, a sound synchronization feature amount, and presentation time information. Then, the separation processing unit 124 supplies the sub channel signal and the sound synchronization feature amount to the buffer 125, causes the buffer 125 to record the sub channel signal and the sound synchronization feature amount therein, and supplies the presentation time information of the sub channel signal to the presentation time information comparison unit 362.

In Step S253, the acquiring unit 361 acquires the presentation time information of the main channel signal by receiving the presentation time information transmitted from the presenting unit 352 and supplies the presentation time information to the presentation time information comparison unit 362.

In Step S254, the presentation time information comparison unit 362 compares the presentation time information supplied from the separation processing unit 124 with the presentation time information supplied from the acquiring unit 361, generates synchronization correction information based on the presentation time information, and supplies the synchronization correction information to the synchronization calculation unit 126.

For example, the synchronization correction information based on the present time information is information indicating a range as a target of the synchronous calculation by the synchronization calculation unit 126 (hereinafter, also referred to as a search range) in the series of the sound synchronization feature amounts at the respective time, which are recorded in the buffer 125.

The search range corresponds to a series of sound synchronization feature amounts with a predetermined length, which includes a sound synchronization feature amount associated with the presentation time information of the sub channel signal indicating the same time as that of the main content being currently reproduced, namely the latest presentation time information acquired by the acquiring unit 361.

Positions in the main channel signal and the sub channel signal corresponding to the same presentation time are mutually synchronized signal positions, namely reproduction positions (frame position) to be reproduced at the same time. Accordingly, it is possible to specify the reproduction position in the sub content which is roughly synchronized with the main content being reproduced, by comparing the presentation time information and detecting the position in the sub channel signal corresponding to the same presentation time information as that of the main channel signal.

If the synchronization correction information based on the presentation time information is generated by comparing the presentation time information, then the processing in Steps S255 and S256 is performed. However, since the processing is the same as that in Steps S103 and S104 in FIG. 16, the description thereof will be omitted. In the processing, the sound of the main content is collected, and a sound synchronization feature amount is calculated from the sound.

In Step S257, the synchronization calculation unit 126 performs the synchronization correction information generating processing to generate the synchronization correction information based on the sound feature amount, and supplies the synchronization correction information to the reproduction processing unit 127. The detailed description will be given of the synchronization correction information generating processing later. In the processing, the sound synchronization feature amount recorded in the buffer 122 and the sound synchronization feature amount recorded in the buffer 125 are compared by using the synchronization correction information based on the presentation time information, and the synchronization correction information based on the sound feature amount is generated.

In Step S258, the reproduction processing unit 127 corrects a reproduction timing of the sub channel signal recorded in the buffer 125 in accordance with the synchronization correction information based on the sound feature amount, which is supplied form the synchronization calculation unit 126, and reproduces the sub content based on the sub channel signal after the correction. In Step S258, the same processing as that in Step S106 in FIG. 16 is performed.

If the sub content is reproduced in synchronization with the main content as described above, the sub content reproduction processing is completed.

The content reproduction system generates the synchronization correction information based on the presentation time information by acquiring the presentation time information of the main content and comparing the presentation time information of the main content with the presentation time information of the sub content, which is included in the sub received signal as described above. Then, the content reproduction system performs matching processing on the sound synchronization feature amount included in the search range indicated by the synchronization correction information based on the presentation time information as a target, and calculates the synchronization correction information based on the sound feature amount.

With such a configuration, it is possible to calculate the synchronization correction information with a less processing amount even in a case where the main content and the sub content are transmitted via different transmission paths, and to reproduce the content in the synchronized manner.

That is, according to the content reproduction system, the sub receiving device 342 first roughly synchronizes the main channel signal with the sub channel signal based on the presentation time information, and calculates the sound synchronization feature amount from the sound signal acquired by collecting the sound of the main content.

Then, the sub receiving device 342 can perform precise content synchronization at a position of the user who is viewing and hearing the sub content being reproduced by the sub receiving device 342 by performing the automatic synchronous calculation with respect to the sound synchronization feature amount of the received main channel signal. Since the presentation time information is used to limit the approximate range of the synchronization position in practice, the processing amount necessary for the automatic synchronous calculation processing based on the sound synchronization feature amount decreases.

For example, it is assumed that the display unit 82 and the speaker 83 in the content reproduction system are arranged at positions away from the display unit 86 and the speaker 87 and that the user views and hears content in the vicinity of the display unit 86 and the speaker 87. In such a case, it takes time to some extent for the sound output from the speaker 83 to reach the position where the user is viewing and hearing the content.

Accordingly, it is difficult to precisely synchronize the reproduction of the main content and the sub content at the position where the user is viewing and hearing the content merely by comparing the presentation time information in such a case. That is, since the speaker 83 and the speaker 87 reproduce the sound of the main content and the sound of the sub content, respectively at the same time, for example, the user hears the sound of the main content and the sound of the sub content with deviation if it takes time for the sound of the main content to reach the user.

In contrast, according to the content reproduction system to which the present technology is applied, the sound of the main content is collected by the microphone 84 which is connected to the sub receiving device 342 and is arranged in the vicinity of the sub receiving device 342, and the synchronous calculation is performed. For this reason, the content reproduction system can reproduce the main content and the sub content in a synchronized state at the position where the user is viewing and hearing the content. Furthermore, the content reproduction system can synchronize the content with a less processing amount by comparing the presentation time information, generating the synchronization correction information based on the presentation time information, and limiting the search range for the matching processing.

<Explanation of Synchronization Correction Information Generating Processing>

Figure 26:
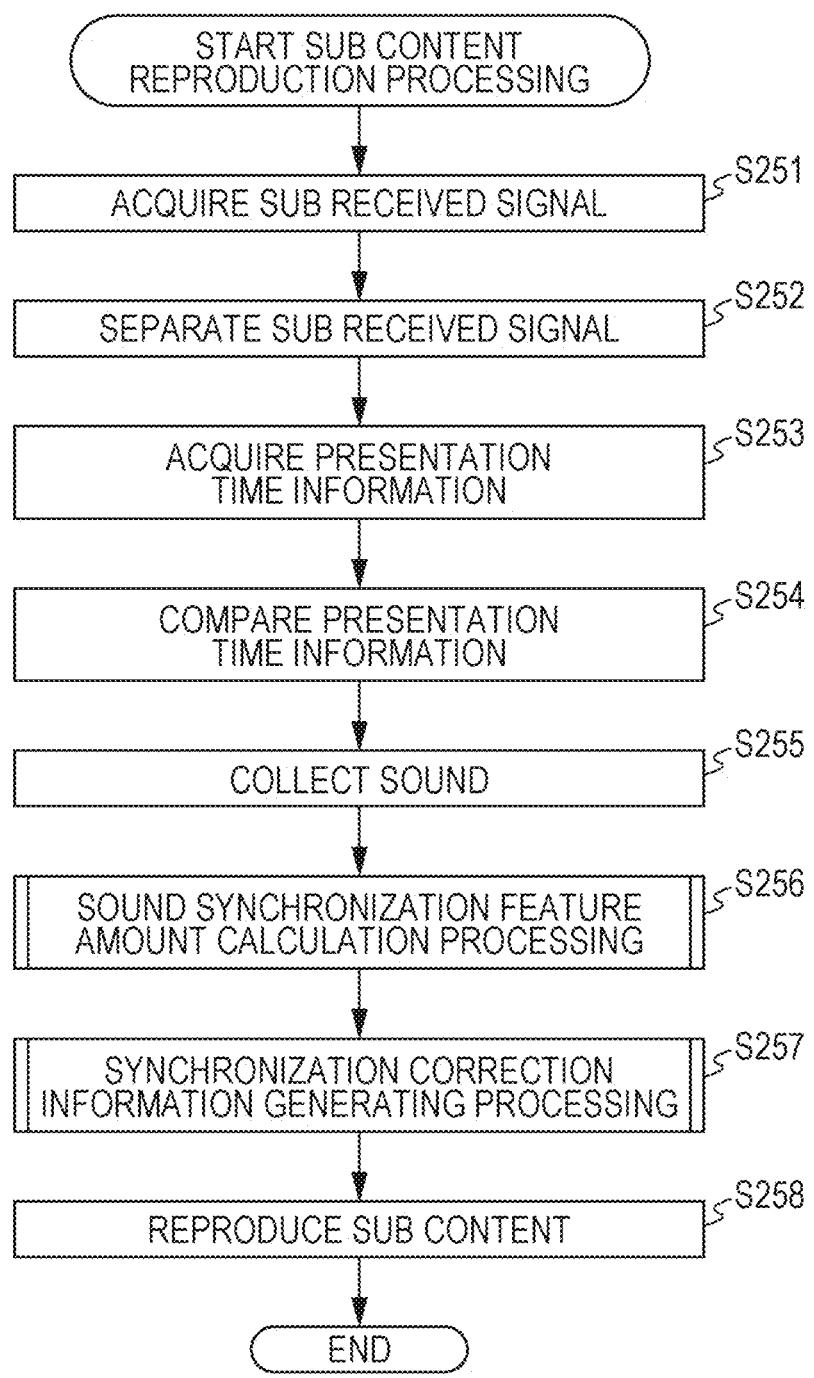
FIG. 26 is a flowchart illustrating the sub content reproduction processing.

Furthermore, a description will be given of the synchronization correction information generating processing corresponding to the processing in Step S257 in FIG. 26 with reference to the flowchart in FIG. 27.

In Step S281, the frame rate conversion unit 181 and the frame rate conversion unit 182 performs the frame rate conversion processing as necessary.

That is, the frame rate conversion unit 181 reads the time-series data of the sound synchronization feature amount for each time section in the main content from the buffer 122, performs the frame rate conversion, namely the downsampling on the sound synchronization feature amount as necessary, and supplies the sound synchronization feature amount to the block merging unit 183.

In addition, the frame rate conversion unit 182 reads only the time-series data included in the search range indicated by the synchronization correction information based on the presentation time information, which is supplied from the presentation time information comparison unit 362, in the time-series data of the sound synchronization feature amount recorded in the buffer 125.

Then, the frame rate conversion unit 182 performs the frame rate conversion, namely the downsampling or the upsampling on the read sound synchronization feature amount as necessary, and supplies the sound synchronization feature amount to the block merging unit 184.

In Step S282, the block merging unit 183 and the block merging unit 184 merges the time-series data of the sound synchronization feature amounts.

Specifically, the block merging unit 183 receives the supply of the time-series data of the sound synchronization feature amount for each time section in the main content from the frame rate conversion unit 181. Then, the block merging unit 183 regards a plurality of (sixty-four, for example) continuous time sections as one block, merges the supplied time-series data of the sound synchronization feature amount in each time section in units of blocks, and supplies the merged time-series data to the similarity calculation unit 185.

In addition, the block merging unit 184 receives the supply of the time-series data of the sound synchronization feature amount in each time section in the main content from the frame rate conversion unit 182. Then, the block merging unit 184 regards a plurality of (sixty-four, for example) continuous time sections as one block, merges the supplied time-series data of the sound synchronization feature amount in each time section in units of blocks, and supplies the merged time-series data to the similarity calculation unit 185.

Figure 18:
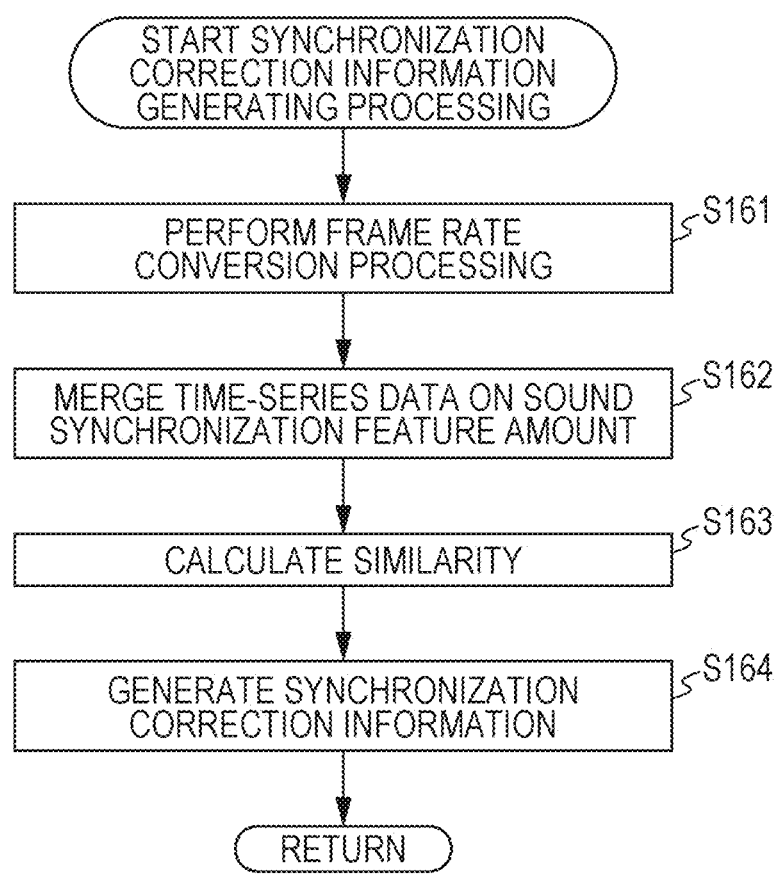
FIG. 18 is a flowchart illustrating synchronization correction information generating processing.

As represented by the arrow A11 in FIG. 28, for example, n blocks X(i) recorded in the buffer 122 and m blocks Y(j) recorded in the buffer 125 are the processing targets in the processing in Step S162 in FIG. 18. That is, the combination of the blocks of the sound synchronization feature amounts as the search targets are n×m combinations. More specifically, the frame rate conversion is appropriately performed on the sound synchronization feature amounts. However, the description will be continued on the assumption that the frame rate conversion is not performed in order to simplify the explanation of FIG. 28.

Here, the blocks Y(j) as the targets of the matching processing are all the blocks recorded in the buffer 125 or blocks in a sufficiently wide range.

In FIG. 28, i is an index of a block of sound synchronization feature amounts acquired by the sound synchronization feature amount calculation unit 121, and j is an index of a block of sound synchronization feature amounts included in the sub received signal.

In addition, X(i) represents time-series data of sound synchronization feature amounts in a block with an index i from among the sound synchronization feature amounts acquired by the sound synchronization feature amount calculation unit 121, and Y(j) represents time-series data of sound synchronization feature amounts in a block with an index j from among the sound synchronization feature amounts included in the sub received signal.

In contrast, in Step S282, only m' blocks included in the search range indicated by the synchronization correction information based on the presentation time information from among m blocks recorded in the buffer 125 are the targets of the matching processing as represented by the arrow A12. That is, only the m' blocks are the targets of the similarity calculation by the similarity calculation unit 185.

In this example, $PTS_i$ represents presentation time information, and a position represented by the presentation time information corresponds to a position in the main content being currently reproduced. In addition, a range with a predetermined length which includes a position corresponding to the presentation time information of the sub content at the same time as that of the presentation time information of the main content, namely a range configured of m' blocks is the search range. Accordingly, combinations of the blocks of the sound synchronization feature amounts as the search targets are n×m' combinations.

It is possible to minimize the range of the sound synchronization feature amounts as targets of the matching processing by using the synchronization correction information based on the presentation time information acquired by comparing the presentation time information, and to thereby significantly reduce the processing time necessary for the search in the similarity calculation.

Figure 27:
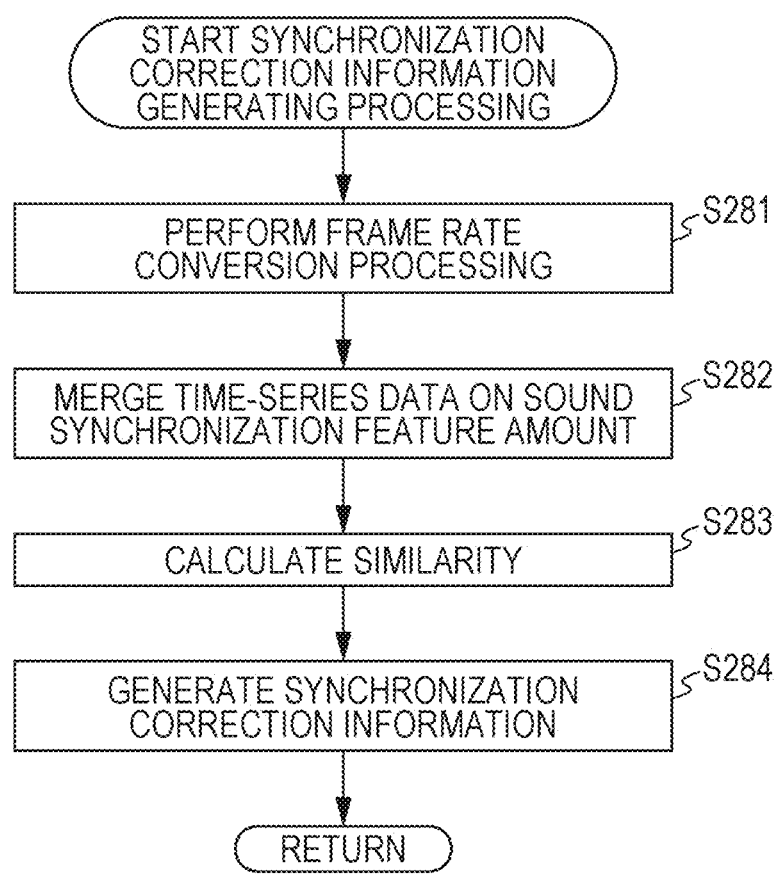
FIG. 27 is a flowchart illustrating the synchronous correction information generating processing.

Returning to the explanation of the flowchart in FIG. 27, if the time-series data of the sound synchronization feature amounts is merged, then the processing proceeds to Step S283. Although the processing in Steps S283 and S284 is performed and the synchronization correction information generating processing is completed, the processing is the same as that in Steps S163 and S164 in FIG. 18, and therefore, the description thereof will be omitted. If the synchronization correction information generating processing is completed, then the processing proceeds to Step S258 in FIG. 26.

As described above, the content reproduction system generates the synchronization correction information based on the sound feature amount by using the sound synchronization feature amounts within the search range indicated by the synchronization correction information based on the presentation time information. With such a configuration, it is possible to generate the synchronization correction information in a robust manner with a less processing amount.

In addition, the providing apparatus 301 shown in FIG. 22 and the content reproduction system shown in FIG. 23 can also be applied to the respective system shown in FIGS. 19 to 21.

Incidentally, the aforementioned series of processing can be executed by hardware or software. In a case of executing the series of processing by software, a program configuring the software is installed in a computer. Here, examples of the computer include a computer incorporated in a dedicated hardware and a general-purpose computer capable of executing various functions by installing various programs.

FIG. 29 is a block diagram showing a configuration example of hardware in a computer which executes the aforementioned series of processing by the program.

In the computer, a central processing unit (CPU) 501, a read only memory (ROM) 502, and a random access memory (RAM) 503 are connected to each other via a bus 504.

Furthermore, an input and output interface 505 is connected to the bus 504. In addition, an input unit 506, an output unit 507, a recording unit 508, a communication unit 509, and a drive 510 are connected to the input and output interface 505.

The input unit 506 is configured of a keyboard, a mouse, a microphone, an imaging device, and the like. The output unit 507 is configured of a display, a speaker, and the like. The recording unit 508 is configured of a hard disk, a non-volatile memory, and the like. The communication unit 509 is configured of a network interface and the like. The drive 510 drives a removable medium 511 such as a magnetic disk, an optical disc, a magnet-optical disc, or a semiconductor memory.

The computer configured as described above performs the aforementioned series of processing by the CPU 501 loading a program recorded in the recording unit 508, for example, on the RAM 503 via the input and output interface 505 and the bus 504 and executing the program.

The program executed by the computer (CPU 501) can be recorded in the removable medium 511 as a package medium, for example, and can be provided. In addition, the program can be provided via a wired or wireless transmission medium such as a local area network, the Internet, or digital satellite broadcasting.

The computer can install the program in the recording unit 508 via the input and output interface 505 by mounting the removable medium 511 on the drive 510. In addition, the program can be installed in the recording unit 508 by receiving the program at the communication unit 509 via a wired or wireless transmission medium. In addition, the program can be installed in advance in the ROM 502 or the recording unit 508.

In addition, the program executed by the computer may be a program according to which the processing is performed in a time series manner in the order described herein or may be a program according to which the processing is performed in parallel or at a necessary timing such as a timing when the program is accessed.

In addition, the embodiments of the present technology are not limited to the aforementioned embodiments, and various modifications can be made without departing from the gist of the present technology.

For example, the present technology can employ a configuration of cloud computing in which a function is shared and cooperatively processed by a plurality of apparatuses.

In addition, the respective steps described in the aforementioned flowcharts can be executed by one apparatus or can be shared and executed by a plurality of apparatuses.

Furthermore, when a plurality of procedures are included in one step, the plurality of procedures included in the step can be executed by one apparatus or can be shared and executed by a plurality of apparatuses.

In addition, the effects described herein are exemplified only for the illustrative purpose and are not intended to present a limitation thereof, and other effects may be achieved.

Furthermore, the present technology can be configured as follows.

(1) An information processing apparatus for reproducing second content in synchronization with reproduction of first content by a second information processing apparatus different from the information processing apparatus, the first content comprising audio content, the information processing apparatus comprising circuitry configured to: extract a first feature from the audio content; obtain a second feature of the audio content, the second feature being together with the second content; compare the first feature with the second feature; and generate, based on results of the comparing, synchronization information used for reproducing the second content in synchronization with the first content.

(2) The information processing apparatus of (1), wherein the circuitry is configured to: acquire an audio signal from sound generated via reproduction of the audio content by the second information processing apparatus; and extract the first feature from the audio signal.

(3) The information processing apparatus of (1) or (2), wherein the second content and the second feature are transmitted to the information processing apparatus at a time determined based on a difference between an arrival time of the first content and an arrival time of the second content and the second feature.

(4) The information processing apparatus of (1), wherein the circuitry is configured to: request transmission of the second content and the second feature; and receive the second content and the second feature which are transmitted in response to the request.

(5) The information processing apparatus of (4), wherein the circuitry is configured to: request transmission of the first content; and receive the first content which is transmitted in response to the request for transmission of the first content.

(6) The information processing apparatus of (1), wherein the circuitry is configured to: extract a first plurality of features from the audio content, the first plurality of features including the first feature; obtain a second plurality of features together with the second content, the second plurality of features including the second feature; compare the first plurality of features with the second plurality of features; and generate, based on results of comparing the first plurality of features with the second plurality of features, the synchronization information used for reproducing the second content in synchronization with the first content.

(7) The information processing apparatus of (1), wherein the circuitry is configured to control reproduction of the second content.

(8) The information processing apparatus of (7), wherein the circuitry is configured to correct a reproduction position of the second content based on the synchronization information.

(9) The information processing apparatus of (1), wherein the circuitry is configured to: acquire presentation time information associated with the first content; and obtain a range of time based on results of comparing the presentation time information associated with the first content and presentation time information associated with the second content, wherein the circuitry is configured to generate the synchronization information at least in part by comparing the second feature with one or more features extracted from one or more portions of the first content appearing in the first content in the range of time.

(10) The information processing apparatus of (1), wherein the circuitry is configured to compare the first feature and the second feature after performing frame rate conversion on at least one of the first feature and the second feature such that a frame rate of the first feature coincides with a frame rate of the second feature.

(11) An information processing method for reproducing second content in synchronization with reproduction of first content, the first content comprising audio content, the information processing method comprising: extracting a first feature from the audio content; obtaining a second feature together with the second content; comparing the first feature with the second feature; and generating, based on results of the comparing, synchronization information used for reproducing the second content in synchronization with the first content.

(12) At least one non-transitory computer readable storage medium storing processor-executable instructions that, when executed by at least one computer, causes the at least one computer to perform an information processing method for reproducing second content in synchronization with reproduction of first content, the first content comprising audio content, the information processing method comprising:
extracting a first feature from the audio content; obtaining a second feature together with the second content; comparing the first feature with the second feature; and generating, based on results of the comparing, synchronization information used for reproducing the second content in synchronization with the first content.

(13) An information processing apparatus, comprising: circuitry configured to: extract a feature from sound generated by reproduction of first content; associate, in synchronization with the first content, the feature with second content that has a time-synchronized relationship with the first content; and output second content and the feature.

(14) The information processing apparatus of (13), wherein the circuitry is configured to output the first content.

(15) The information processing apparatus of (14), wherein the circuitry is configured to output the second content and the feature at a time determined based on a difference between arrival time of the first content and the second content.

(16) The information processing apparatus of (14), wherein the circuitry is configured to output the second content and the feature in response to a request for their transmission.

(17) The information processing apparatus of (16), wherein the circuitry is configured to output the first content in response to a request for its transmission.

(18) The information processing apparatus of (13), wherein the circuitry is configured to: extract a plurality of features from sound generated from reproducing a plurality of portions of the first content; and associate and output the extracted features with the second content.

(19) The information processing apparatus of (13), wherein the circuitry is configured to: downsample the feature to obtain a downsampled feature; and output the second content and the downsampled feature.

(20) An information processing method, comprising: extracting a feature from sound generated by reproduction of first content; associating, in synchronization with the first content, the feature with second content that has a time-synchronized relationship with the first content; and outputting the second content and the feature.

(21) At least one non-transitory computer-readable storage medium that, when executed by at least one computer, causes the at least one computer to perform: extracting a feature from sound generated by reproduction of first content; associating, in synchronization with the first content, the feature with second content that has a time-synchronized relationship with the first content; and outputting the second content and the feature.

It should also be appreciated that aspects of the technology described herein are not limited to allowing for synchronous reproduction of content between two devices. Accordingly, in some embodiments, techniques described herein may be applied to synchronous reproduction of content among more than two devices (e.g., three, four, five, at least five, at least ten, between two and ten, etc.).

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 11 providing apparatus
22 output unit
23 sound synchronization feature amount calculation unit
24 multiplexing processing unit
25 output unit
81 main receiving device
85 sub receiving device
111 input unit
112 reproduction processing unit
121 sound synchronization feature amount calculation unit
123 input unit
126 synchronization calculation unit
127 reproduction processing unit
311 reference time signal generation unit
352 presenting unit
361 acquiring unit
362 presentation time information comparison unit

The invention claimed is:
1. A signal processing apparatus, comprising:
a frequency band dividing unit configured to divide a sound signal included in a first content into a plurality of frequency bands;

a periodicity detection unit configured to detect periodicity information of each frequency band supplied from the frequency band dividing unit;

a periodicity information merging unit configured to merge the periodicity information detected by the periodicity detection unit;

a peak detection unit configured to generate peak information by detecting a peak position of the merged periodicity information;

a downsampling unit configured to downsample the peak information for a plurality of time sections to a downsampled peak information for a time section; and an output unit configured to output the downsampled peak information as a synchronization feature amount for synchronizing a second content with the first content.

2. A method, comprising:

dividing a sound signal included in a first content into a plurality of frequency bands;

detecting periodicity information of each frequency band of the plurality of frequency bands;

merging the detected periodicity information;

generating peak information by detecting a peak position of the merged periodicity information;

downsampling the peak information for a plurality of time sections to a downsampled peak information for a time section; and outputting the downsampled peak information as a synchronization feature amount for synchronizing a second content with the first content.

3. At least one non-transitory computer readable storage medium storing processor-executable instructions that, when executed by at least one computer, cause the at least one computer to perform a method, comprising:

dividing a sound signal included in a first content into a plurality of frequency bands;

detecting periodicity information of each frequency band of the plurality of frequency bands;

merging the detected periodicity information;

generating peak information by detecting a peak position of the merged periodicity information;

downsampling the peak information for a plurality of time sections to a downsampled peak information for a time section; and outputting the downsampled peak information as a synchronization feature amount for synchronizing a second content with the first content.

* * * * *